(12) United States Patent
Mullin et al.

(10) Patent No.: US 9,449,446 B1
(45) Date of Patent: Sep. 20, 2016

(54) SYSTEM EMPLOYING A PLURALITY OF BRAIN/BODY-GENERATED INPUTS TO CONTROL THE MULTI-ACTION OPERATION OF A CONTROLLABLE DEVICE

(71) Applicant: Make Ideas, LLC, La Jolla, CA (US)

(72) Inventors: Keith Alan Mullin, La Jolla, CA (US); Christopher Taddei, Carlsbad, CA (US)

(73) Assignee: Make Ideas, LLC, La Jolla, CA (US)

( * ) Notice: Subject to any disclaimer, the term of this patent is extended or adjusted under 35 U.S.C. 154(b) by 393 days.

(21) Appl. No.: 13/903,956

(22) Filed: May 28, 2013

Related U.S. Application Data

(60) Provisional application No. 61/652,214, filed on May 27, 2012, provisional application No. 61/754,383, filed on Jan. 18, 2013.

(51) Int. Cl.
*G05B 19/00* (2006.01)
*G07C 9/00* (2006.01)

(52) U.S. Cl.
CPC .................. *G07C 9/00158* (2013.01)

(58) Field of Classification Search
CPC .......... G06F 3/015; G06F 3/002; G06N 3/02
USPC ....................................................... 340/5.52
See application file for complete search history.

(56) References Cited

U.S. PATENT DOCUMENTS

| | | | |
|---|---|---|---|
| 5,474,082 A | 12/1995 | Junker | |
| 5,692,517 A | 12/1997 | Junker | |
| 5,788,648 A * | 8/1998 | Nadel | 600/544 |
| 6,636,763 B1 | 10/2003 | Junker et al. | |
| 7,088,234 B2 * | 8/2006 | Naito et al. | 340/539.11 |
| 2005/0267597 A1* | 12/2005 | Flaherty et al. | 623/24 |
| 2006/0049957 A1* | 3/2006 | Surgenor et al. | 340/825.19 |
| 2006/0149338 A1* | 7/2006 | Flaherty et al. | 607/49 |
| 2010/0113898 A1* | 5/2010 | Kim et al. | 600/310 |
| 2010/0234146 A1 | 9/2010 | Mullin | |

\* cited by examiner

*Primary Examiner* — Vernal Brown
(74) *Attorney, Agent, or Firm* — Tillman Wright, PLLC; James D. Wright; David R. Higgins

(57) ABSTRACT

A system employing a plurality of brain/body-generated inputs to control multi-action operation includes a controllable device, that performs at least two actions via remote control, and a head-mounted user interface device. The UI device includes a user cranium-mounted frame, first and second sensors supported by the frame, a processor, and a transmitter. The first sensor includes an electrode for contacting the cranium when the frame is worn and adapted to receive a bioelectric signal from the cranium. The second sensor receives hands-free brain/body input from the user. The processor uses application software process input provided by the first and second sensors and generates different outputs, corresponding to different commands. The transmitter transmits signals, based on the different commands, to the controllable device to initiate the different actions performed by the device.

23 Claims, 24 Drawing Sheets

SYSTEM EMPLOYING A PLURALITY OF BRAIN/BODY-GENERATED INPUTS TO CONTROL THE MULTI-ACTION OPERATION OF A CONTROLLABLE DEVICE

CROSS-REFERENCE TO RELATED APPLICATION

The present application is a U.S. nonprovisional patent application of, and claims priority under 35 U.S.C. §119(e) to, each of (1) U.S. provisional patent application Ser. No. 61/652,214, filed May 27, 2012 and entitled "Head-Mounted Brain-body Actuated Multi-signal Controller," and (2) U.S. provisional patent application Ser. No. 61/754,383, filed Jan. 18, 2013 and entitled "Head-Mounted Brain-body Actuated Multi-signal Controller With Accessory Sensors." Each such provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to the use of body/brain signals to control a device, and more specifically it relates to systems, devices and methods employing a plurality of brain/body-generated inputs to control the multi-action operation of a controllable device.

2. Background

It can be appreciated that brain/body signaling machine systems and head-mounted display equipment have been in use for years. Brain/body signaling machine systems or products such as the Mindflex®, the Starwars Jedi Trainer® or Muse™ are typical embodiments of conventional brain/body signaling machine systems.

The main problem with these above mentioned, conventional brain/body signaling machine systems is that they only have one brain/body electroencephalography (EEG) signal that is received, processed and transmitted to a single action machine or electronic device. Such systems and devices have no methods or means to remotely operate a machine with multi-actions. Another problem with conventional brain/body signaling machine systems is that they are not able to simultaneously receive process and transmit multiple brain/body signals and accessory sensor control signals. Another problem with conventional brain/body signaling machine systems is that they are not able to process and transmit other mind-body signals such as electromyographic (EMG), electrooculographic (EOG), electroencephalographic (EEG) signals, accessory signals controls and/or biosignal data to operate a multi-action machine.

Head-mounted displays (HMD) equipped with camera devices or displays have been used for years, such as for Google's, Project Glass head-mounted display system, in Oakley's augmented reality glasses and in Apple's laser light display glasses.

A head-mounted display (HMD) is an imaging display device that a person wears on the head in order to have images or video information directly displayed in front of the eyes. HMDs are also known as near-to-eye displays. A HMD has either one or two small CRT, LCD or OLED displays with magnifying lenses and other associated optical elements. The display(s) and optics are embedded in a helmet, glasses, or a visor, which a User can wear.

HMDs may be configured as binocular HMDs for dual eye use. HMDs may also be configured as monocular HMDs for single eye use. The arrangement generally depends on the desired needs of the User.

Some HMDs can be used to view a see-through image imposed upon a real world view, thereby creating what is typically referred to as an augmented reality. This is accomplished by reflecting the video images through partially reflective mirrors, such that the real world is seen through the mirrors' reflective surfaces. The augmented reality can be combined with the stereoscopic images in various types of applications. Some examples include applications in surgery, where radiographic data, such as CAT scans or MRI imaging can be combined with the surgeon's vision. Military, police and firefighters use HMDs to display relevant tactical information, such as maps or thermal imaging data. Engineers and scientists use HMDs to provide stereoscopic views of CAD schematics, simulations or remote sensing applications. Consumer devices are also available for use in gaming and entertainment applications.

The main problem with the above mentioned conventional head-mounted displays and glasses (HMDs) is that they have no way to easily control the images or software applications which are being displayed by the HMD. Another problem with the above mentioned conventional head-mounted displays (HMDs) and glasses is that they have no way to easily control the User interface of software applications which are being displayed in the HMD. Another problem with the above mentioned conventional head-mounted displays and glasses (HMDs) is that they have no way to easily control software programs which may be used to operate and control a machine or electronic device.

Another problem with the above mentioned conventional head-mounted displays and glasses (HMDs) is that they have no way to easily control a computer or computer medium which is related, accessed or displayed by the HMD. The computer readable medium is any data storage device that can store data which can thereafter be read by a computer system. The computer readable medium can also be distributed over network-coupled computer systems so that the computer readable code is stored and executed in a distributed fashion, such as on a computer network, the internet or internet cloud.

The advent of interactive computer systems has spurred the development of a variety of devices for enabling a User to easily input spatial coordinate data into a computer. Computer systems include some means such as a "mouse", "joystick", or digitizing tablet for permitting a User to move a cursor displayed on a screen and to indicate screen coordinates by depressing a button when the cursor is in the desired screen location. A typical "mouse" comprises a chassis containing a ball, with a part of the ball protruding through the underside of the chassis. When an operator moves the mouse about on a flat surface, the ball rotates. Sensors in the chassis detect the rotation of the ball about two perpendicular, horizontal axes and a computer can determine the displacement of the center of the ball from a reference point in two-dimensional space from the sensor outputs, the displacement therefore representing a two-dimensional spatial coordinate. A typical "optical" mouse operates on a pad having a reflective grid on its surface. A light emitting diode on the mouse shines a light beam on the pad which is reflected back to a light sensor on the mouse as the light passes over a grid line, enabling the mouse to detect movement. Graphics tablets employ a pad with a fine grid of wires periodically conducting electrical pulses. The operator moves a stylus about on the pad, the stylus having a sensor for detecting the pulses, and the position of the stylus on the tablet is determined by the timing of the pulses detected. An "inertial mouse" includes accelerometers for producing output signals of magnitudes proportional to its acceleration in two non-parallel directions forming a two-dimensional cartesian coordinate system. The output signal of each accelerometer is integrated to provide data from which the computer can determine the movement of the inertial mouse in two-dimensional space.

A problem with the above mentioned computer control devices are that they require a User to use their hands, fingers or a stylus to operate a "mouse" or "mouse" type controller. Another problem with these computer control devices is that they cannot be operated by the User using brain/body signals combined with accessory signal data.

Accessory Sensors such as temperature sensors, heart rate sensors, Photosensor, skin conductive sensors, barometer and tilt sensors have been known for years. Such sensors typically provide sensor data to computers so users may view numerical data acquired by the sensor or for a computer to process said data in various manners. Tilt sensors in such devices as the multipurpose controller invented by M. Parshionikar, (Publication number S20120229248 A1), Nintendo's Game Boy Advance, Nintendo's Wii controllers, Microsoft's Sidewinder, Sony's Play Station 3 and Wow Wee's robotic controllers; all use tilting sensors to control electronic devices and software programs. None of the above mentioned sensors use EEG brain/body signals together with sensor data to operate and control a multi-action machine, computer or software program by a plurality of brain-body actuated signals combined with Accessory Sensor signal data. The Parshionikar invention monitors and uses facial expressions or movements of facial muscles to control electronic devices. Parshionikar discloses sensing of facial muscles via EMG and EOG signals, but the Parshionikar invention does not utilize EEG brain/body signals which are separate from facial muscle expression signals.

While the above referenced devices may be suitable for the particular purpose to which they address, they are not as suitable for persons who to wish to operate a multi-action machine, electronic device, computer or computer application(s) in a hands-free method using brain/body signals and accessory sensor signal data. The main problem with the above mentioned conventional brain/body signaling systems, machines, HMDs and computer mouse(s) are that a multi-action machine or computer applications cannot be effectively controlled using multiple brain/body signals combined with accessory sensor signals.

In these respects, the Head-Mounted Brain-body Actuated Multi-signal Controller with Accessory Sensors according to the present invention substantially departs from the conventional concepts and designs of the prior art, and in so doing provides a head mounted system and apparatus primarily developed for the purpose of a User to operate a multi-action machine or computer application by a plurality of brain-body actuated signals with accessory sensor signals.

SUMMARY OF THE PRESENT INVENTION

In one or more aspects, the present invention generally relates to a head-mounted brain-body actuated multi-signal controller which includes the User, Glasses, Electrodes, Accessory Sensors, Multi-signal Neural Interface Amplifier, Computer, Controller(s), Processor(s), Application Software, Wireless Transmitter, Multi-action Machine, and/or an Imaging Display Device, together with the power supply needs of the system components to operate them.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

One non-mandatory object is to provide a Head-Mounted Brain-body Actuated Multi-signal Controller with Accessory Sensors is for a User to operate an electronic device or multi-action machine or via wireless connection by a plurality of Brain-Body actuated signals and accessory sensor signals.

An additional or alternative non-mandatory object is to provide a Head-Mounted Brain-body Actuated Multi-signal Controller with Accessory Sensors for a User to operate a computer or a computer software program.

Another additional or alternative non-mandatory object is to provide a Head-Mounted Brain-body Actuated Multi-signal Controller with Accessory Sensors for a User to operate a software program or User interface which is displayed by a separate computer or smart phone.

Another additional or alternative non-mandatory object is to provide a Head-Mounted Brain-body Actuated Multi-signal Controller with Accessory Sensors for a User to operate internet software applications.

Another additional or alternative non-mandatory object is to provide a Head-Mounted Brain-body Actuated Multi-signal Controller with Accessory Sensors for a User to operate a software program or User interface which is accessed or displayed by an HMD.

Another additional or alternative non-mandatory object is to provide a Head-Mounted Brain-body Actuated Multi-signal Controller with Accessory Sensors that enables a User to remotely operate a machine, mechanical device, toy, or electrical or lighting system by a plurality of Brain-Body actuated signals and accessory sensor signals.

Another additional or alternative non-mandatory object is to provide a Head-Mounted Brain-body Actuated Multi-signal Controller with accessory sensor that enables a User to operate a wireless multi-action machine or multi-action mechanical device from a distance by a plurality of Brain-Body actuated signals and accessory sensor signals.

Another additional or alternative non-mandatory object is to provide a Head-Mounted Brain-body Actuated Multi-signal Controller with accessory sensor that enables a User to operate a head-mounted display (HMD) is an imaging display device by a plurality of Brain-Body actuated signals and accessory sensor signals.

Another additional or alternative non-mandatory object is to provide a Head-Mounted Brain-body Actuated Multi-signal Controller with Accessory Sensors that enables a User to operate a multi-action mechanical toy by producing brain-body signals (thinking), motion signals and biosignals.

Another additional or alternative non-mandatory object is to provide a Head-Mounted Brain-body Actuated Multi-signal Controller with accessory sensor that enables a User to operate a multi-action mechanical wireless connected toy by producing brain-body signals (thinking) with accessory sensor signals.

Another additional or alternative non-mandatory object is to provide a Head-Mounted Brain-body Actuated Multi-signal Controller with Accessory Sensor that enables a User to think and remotely control a multi-action machine, mechanical device or toy by the processing and broadcasting a plurality of brain/body signals and accessory signals.

Another additional or alternative non-mandatory object is to provide a Head-Mounted Brain-body Actuated Multi-signal Controller with accessory Sensor that enables a User to control a multi-action machine, mechanical device, electronic device or toy, wirelessly, with the wireless communication methodology transferring information between two or more points that are not connected by an electrical conductor. Such methods being but not limited to: Radio Control, Light Control, Laser Control, Bluetooth, WiFi, Sound, etc. wireless transmission methods.

Another additional or alternative non-mandatory object is to provide a Head-Mounted Brain-body Actuated Multi-signal Controller with accessory Sensor that uses and processes a plurality of signals from a multi-signal Neural Impulse Actuator and via a wireless connection, transmits a plurality signals to control and or operate a multi-action mechanical or electrical device.

Another additional or alternative non-mandatory object is to provide a Head-Mounted Brain-body Actuated Multi-signal Controller with accessory Sensor that provides the User eye protection from such items as, but not limited to, flying objects, bright light, sun light, computer screen lighting and light filtering.

Broadly defined, the present invention according to one aspect is a system employing a plurality of brain/body-generated inputs to control the multi-action operation of a toy. Broadly defined, the present invention according to a first aspect includes a system employing a plurality of brain/body-generated inputs to control the multi-action operation of a toy that includes a toy operable to perform at least two actions via remote control and a head-mounted user interface device. The head-mounted user interface device includes a frame, adapted to be worn on the cranium of a user, a first sensor that includes an electrode, that is supported by the frame, arranged to be placed in contact with the cranium when the frame is worn by the user, and adapted to receive a bioelectric signal from the cranium, a second sensor supported by the frame and adapted to receive hands-free brain/body input from the user, a processor utilizing application software to receive and process input provided by the first and second sensors, including the bioelectric signal and hands-free brain/body input, and to generate an output selected from at least first and second different outputs, and a transmitter that is communicatively connected to the processor and is adapted to transmit a signal to the toy, the signal representative of a command, corresponding to the selected output, to initiate a first or second of the at least two actions performed by the toy.

In features of this aspect, the head-mounted user interface device may include a neural interface amplifier communicatively coupled between the electrode and the processor to amplify the bioelectric signal received from the cranium and provide the amplified signal to the processor.

In further features of this aspect, the frame may include two ear supports adapted to extend over, and be retained by, ears on the cranium of the user, a frame support extending between the two ear supports, and a nose support depending from the frame support and adapted to rest on a nose on the cranium of the user. In a further feature, the frame is a glasses frame that further includes a lens depending from the frame support.

In further features of this aspect, the electrode is a first electrode adapted to receive a first bioelectric signal from the cranium, wherein the second sensor comprises a second electrode adapted to receive a second bioelectric signal from the cranium. In a further feature, the first bioelectric signal and the second bioelectric signal include an electroencephalographic signal and an electromyographic signal. In a further feature, the first bioelectric signal and the second bioelectric signal include an electroencephalographic signal and an electrooculographic signal. In yet a further feature, the first bioelectric signal and the second bioelectric signal include an electromyographic signal and an electrooculographic signal.

In further features of this aspect, the head-mounted user interface device further includes an image display system supported by the frame. In a further feature, the image display system includes a controller/projector and a screen. In a further feature, the screen is positioned in the direct view of the user. In a further feature, the screen is configured to superimpose a see-through image over the user's view of the user's surroundings. In yet a further feature, the image display system is adapted to display a plurality of options to the user, wherein the input provided by the first and second sensors is interpreted by the processor as a selection of a particular one of the plurality of options, and wherein the first and second different outputs are generated on the basis of the selected option.

In further features of this aspect, the second sensor is an accessory sensor. In a further feature, the electrode is adapted to receive an electroencephalographic signal. In a further feature, the electrode is adapted to receive and distinguish one or more of a Alpha, a Beta, a Delta, a Gamma, and a Theta wave in the electroencephalographic signal. In a further feature, the processor is adapted to recognize and respond to the strength of the electroencephalographic signal. In a further feature, the electrode is adapted to receive an electromyographic signal. In a further feature, the accessory sensor is a temperature sensor adapted to measure a body temperature of the user when the frame is worn by the user. In a further feature, the accessory sensor is a skin conductance sensor adapted to measure electrical conductance of skin of the user when the frame is worn by the user. In yet a further feature, the accessory sensor is a tilt sensor adapted to monitor user motion when the frame is worn by the user.

In further features of this aspect, the processor utilizes the application software to map the input provided by the first and second sensors, including the bioelectric signal, to any of a plurality of particular commands to be communicated to the toy.

In further features of this aspect, the toy is a remote control vehicle. In a further feature, the remote control vehicle is a car, a truck, a boat, a plane, or a helicopter. In a further feature, the at least two actions which the remote control vehicle is operable to perform include at least two of moving forward, moving backward, turning left, turning right, moving upward, moving downward, illuminating a light, and producing a sound.

Broadly defined, the present invention according to another aspect is a system employing a plurality of brain/body-generated inputs to control the multi-action operation of a device that includes a controllable device, operable to perform at least two actions via remote control and a head-mounted user interface device. The head-mounted user interface device includes a frame adapted to be worn on the cranium of a user, a first sensor, comprising an electrode, that is supported by the frame, arranged to be placed in contact with the cranium when the frame is worn by the user, and adapted to receive a bioelectric signal from the cranium, a second sensor supported by the frame and adapted to receive hands-free brain/body input from the user, a processor utilizing application software to receive and process input provided by the first and second sensors, including the bioelectric signal and hands-free brain/body input, and to generate an output selected from at least first and second different outputs, and a transmitter that is communicatively connected to the processor and is adapted to transmit a signal to the controllable device, the signal representative of a command, corresponding to the selected output, to initiate a first or second of the at least two actions performed by the controllable device.

In features of this aspect, the head-mounted user interface device may include a neural interface amplifier communicatively coupled between the electrode and the processor to amplify the bioelectric signal received from the cranium and provide the amplified signal to the processor.

In further features of this aspect, the frame may include two ear supports adapted to extend over, and be retained by, ears on the cranium of the user, a frame support extending between the two ear supports, and a nose support depending from the frame support and adapted to rest on a nose on the cranium of the user. In a further feature, the frame is a glasses frame that further includes a lens depending from the frame support.

In further features of this aspect, the electrode is a first electrode adapted to receive a first bioelectric signal from the cranium, wherein the second sensor comprises a second electrode adapted to receive a second bioelectric signal from the cranium. In a further feature, the first bioelectric signal and the second bioelectric signal include an electroencephalographic signal and an electromyographic signal. In a further feature, the first bioelectric signal and the second bioelectric signal include an electroencephalographic signal and an electrooculographic signal. In yet a further feature, the first bioelectric signal and the second bioelectric signal include an electromyographic signal and an electrooculographic signal.

In further features of this aspect, the head-mounted user interface device further includes an image display system supported by the frame. In a further feature, the image display system includes a controller/projector and a screen. In a further feature, the screen is positioned in the direct view of the user. In a further feature, the screen is configured to superimpose a see-through image over the user's view of the user's surroundings. In yet a further feature, the image display system is adapted to display a plurality of options to the user, wherein the input provided by the first and second sensors is interpreted by the processor as a selection of a particular one of the plurality of options, and wherein the first and second different outputs are generated on the basis of the selected option.

In further features of this aspect, the second sensor is an accessory sensor. In a further feature, the electrode is adapted to receive an electroencephalographic signal. In a further feature, the electrode is adapted to receive and distinguish one or more of a Alpha, a Beta, a Delta, a Gamma, and a Theta wave in the electroencephalographic signal. In a further feature, the processor is adapted to recognize and respond to the strength of the electroencephalographic signal. In a further feature, the electrode is adapted to receive an electromyographic signal. In a further feature, the accessory sensor is a temperature sensor adapted to measure a body temperature of the user when the frame is worn by the user. In a further feature, the accessory sensor is a skin conductance sensor adapted to measure electrical conductance of skin of the user when the frame is worn by the user. In yet a further feature, the accessory sensor is a tilt sensor adapted to monitor user motion when the frame is worn by the user.

In further features of this aspect, the processor utilizes the application software to map the input provided by the first and second sensors, including the bioelectric signal, to any of a plurality of particular commands to be communicated to the controllable device.

In further features of this aspect, the controllable device is a toy. In a further feature, the toy is a remote control vehicle. In a further feature, the remote control vehicle is a car, a truck, a boat, a plane, or a helicopter. In a further feature, the at least two actions which the remote control vehicle is operable to perform include at least two of moving forward, moving backward, turning left, turning right, moving upward, moving downward, illuminating a light, and producing a sound.

Broadly defined, the present invention according to another aspect is a head-mounted user interface device for controlling the multi-action operation of a toy using a plurality of brain/body-generated inputs, that includes a frame, adapted to be worn on the cranium of a user, a first sensor, comprising an electrode, that is supported by the frame, arranged to be placed in contact with the cranium when the frame is worn by the user, and adapted to receive a bioelectric signal from the cranium, a second sensor supported by the frame and adapted to receive hands-free brain/body input from the user, a processor utilizing application software to receive and process input provided by the first and second sensors, including the bioelectric signal and hands-free brain/body input, and to generate an output selected from at least first and second different outputs and a transmitter that is communicatively connected to the processor and is adapted to transmit a signal to a toy, the signal representative of a command, corresponding to the selected output, to initiate a first or second of at least two actions performed by the toy.

In features of this aspect, the head-mounted user interface device may include a neural interface amplifier communicatively coupled between the electrode and the processor to amplify the bioelectric signal received from the cranium and provide the amplified signal to the processor.

In further features of this aspect, the frame may include two ear supports adapted to extend over, and be retained by, ears on the cranium of the user, a frame support extending between the two ear supports, and a nose support depending from the frame support and adapted to rest on a nose on the cranium of the user. In a further feature, the frame is a glasses frame that further includes a lens depending from the frame support.

In further features of this aspect, the electrode is a first electrode adapted to receive a first bioelectric signal from the cranium, wherein the second sensor comprises a second electrode adapted to receive a second bioelectric signal from the cranium. In a further feature, the first bioelectric signal and the second bioelectric signal include an electroencephalographic signal and an electromyographic signal. In a further feature, the first bioelectric signal and the second bioelectric signal include an electroencephalographic signal and an electrooculographic signal. In yet a further feature, the first bioelectric signal and the second bioelectric signal include an electromyographic signal and an electrooculographic signal.

In further features of this aspect, the head-mounted user interface device further includes an image display system supported by the frame. In a further feature, the image display system includes a controller/projector and a screen. In a further feature, the screen is positioned in the direct view of the user. In a further feature, the screen is configured to superimpose a see-through image over the user's view of the user's surroundings. In yet a further feature, the image display system is adapted to display a plurality of options to the user, wherein the input provided by the first and second sensors is interpreted by the processor as a selection of a particular one of the plurality of options, and wherein the first and second different outputs are generated on the basis of the selected option.

In further features of this aspect, the second sensor is an accessory sensor. In a further feature, the electrode is adapted to receive an electroencephalographic signal. In a further feature, the electrode is adapted to receive and distinguish one or more of a Alpha, a Beta, a Delta, a Gamma, and a Theta wave in the electroencephalographic signal. In a further feature, the processor is adapted to recognize and respond to the strength of the electroencephalographic signal. In a further feature, the electrode is adapted to receive an electromyographic signal. In a further feature, the accessory sensor is a temperature sensor adapted to measure a body temperature of the user when the frame is worn by the user. In a further feature, the accessory sensor is a heart rate sensor adapted to measure a heart rate of the user when the frame is worn by the user. In a further feature, the accessory sensor is a skin conductance sensor adapted to measure electrical conductance of skin of the user when the frame is worn by the user. In yet a further feature, the accessory sensor is a tilt sensor adapted to monitor user motion when the frame is worn by the user.

In further features of this aspect, the processor utilizes the application software to map the input provided by the first and second sensors, including the bioelectric signal, to any of a plurality of particular commands to be communicated to the toy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
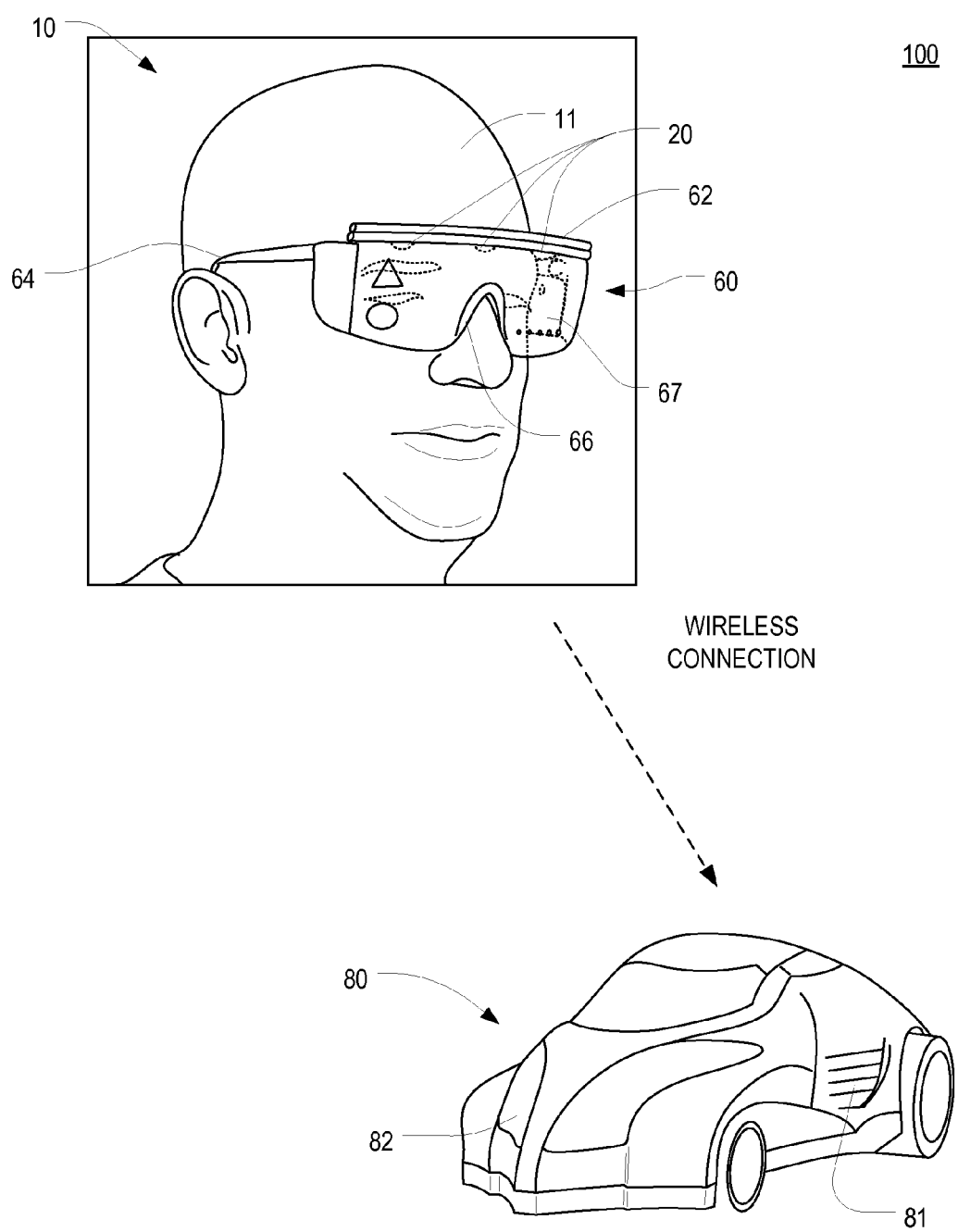
FIG. 1 is perspective view of a system employing a plurality of brain/body-generated inputs to control the multi-action operation of a controllable device in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

FIG. 1 is perspective view of a system 100 employing a plurality of brain/body-generated inputs to control the multi-action operation of a controllable device 80 in accordance with one or more preferred embodiments of the present invention. The system 100 includes a head-mounted user interface device 60, worn on the head of a user 10, that controls a device 80, via wireless connection, on the basis of input captured or received directly from the head of the user 10 by one or more electrodes 20. In at least some embodiments, the head-mounted interface device 60 includes a pair of glasses 61 having a frame support 62, ear supports 64, and nose support 66, on or in which the electrodes 20 and various other operational components may be mounted. As shown in FIG. 1, the glasses 61, which when carrying the operational components are sometimes referred to herein as controller glasses, are worn in generally conventional manner on the cranium 11 of the user 10, wherein the glasses 60 are supported on the user's cranium 11 by the ear supports 64 and the nose support 66. The user 10 sees out of the controller glasses 61 through the glasses lens 67, which also provides eye protection from flying objects.

Figure 2:
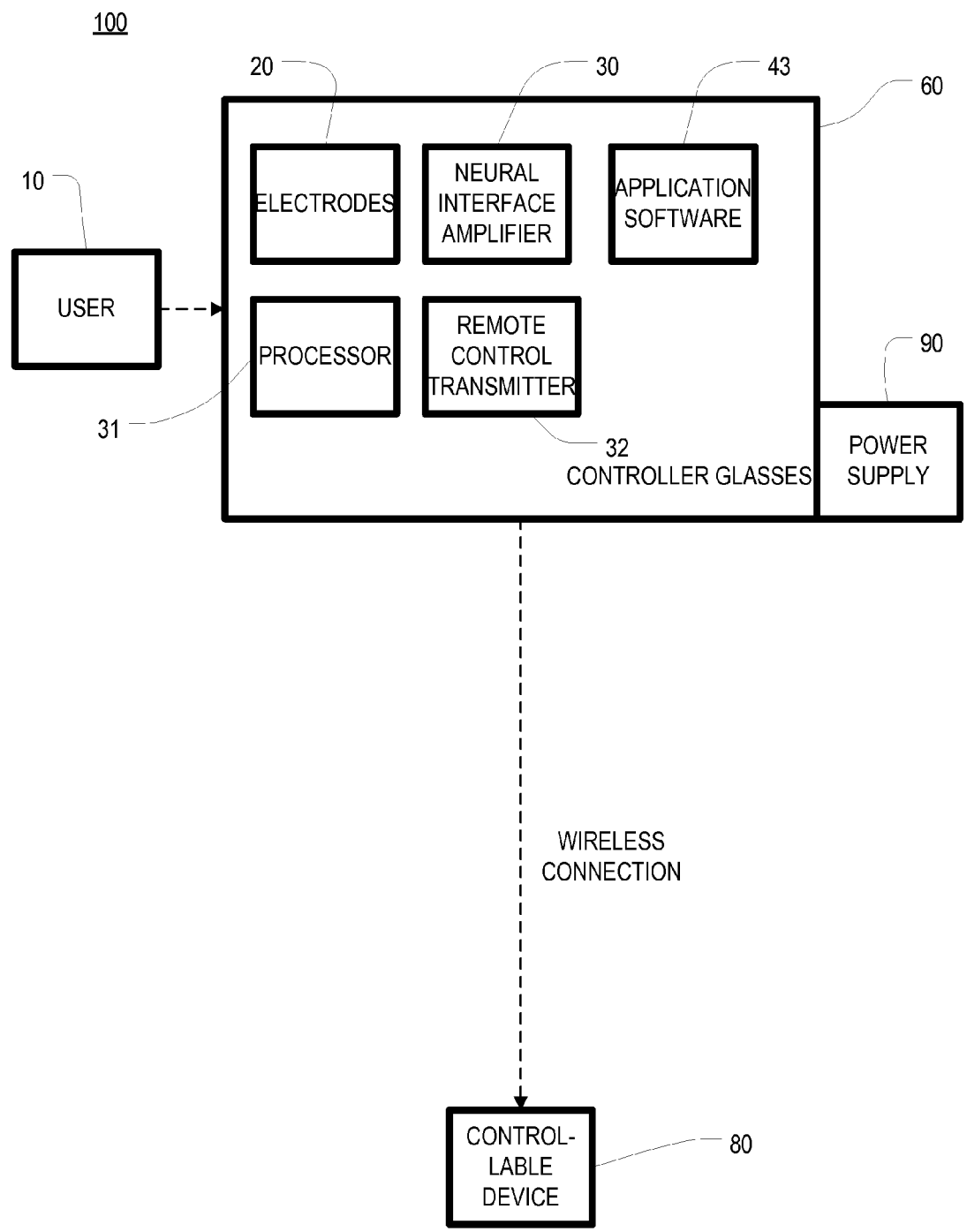
FIG. 2 is a block diagram of one implementation of the system of FIG. 1.

FIG. 2 is a block diagram of one implementation of the system 100 of FIG. 1. As shown therein, the head-mounted user interface device 60 includes electrodes 20 for receiving input from the head 11 of the user 10, a neural interface amplifier 30, one or more processors 31, application software 43, a remote control transmitter 32, and a power supply 90, all carried in or on the glasses 61. The head-mounted user interface device 60 controls the device 80, which may be a remote-control toy car (as shown in FIG. 1) or other machine, electronic device, or the like, using a wireless connection. These components and their operation are described in greater detail hereinbelow.

The electrodes 20 are sensor elements that are placed in contact with the User's cranium and capture a plurality electrical biometric signal activity data such as electroencephalographic, electromyographic, electrooculographic potentials or signals. In some embodiments, the electrodes and/or the processor distinguishes between the strength of these signals, between the Alpha, Beta, Delta, Gamma, and Theta waves of the electroencephalographic signals or corresponding waves in other signals, or both. The electrodes 20 may also capture other user biometric data such as user temperature, heart rate and skin-conductivity. The electrodes 20 are the sensors for the Multi-signal Neural Interface Amplifier and are placed in direct contact with the user's cranium 11, for signal input.

Figure 3:
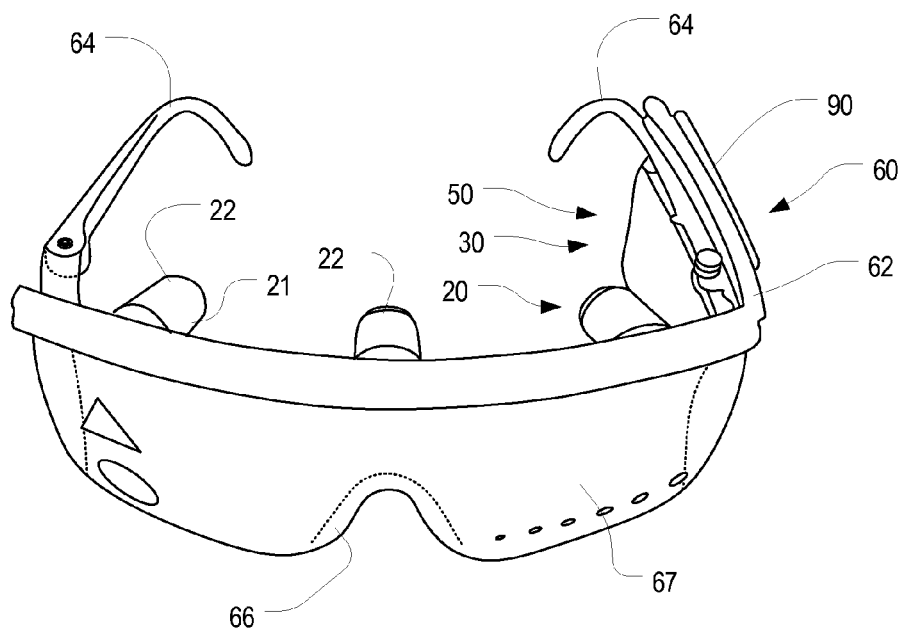
FIG. 3 is a front perspective view of the head-mounted user interface device of FIG. 1.
Figure 4:
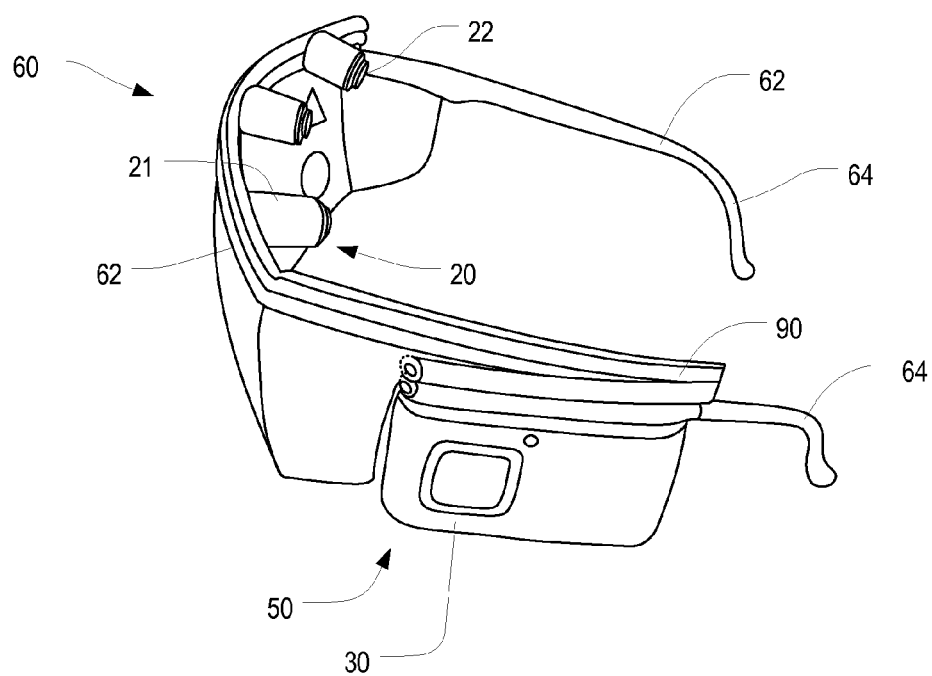
FIG. 4 is a left side perspective view of the head-mounted user interface device of FIG. 1.
Figure 5:
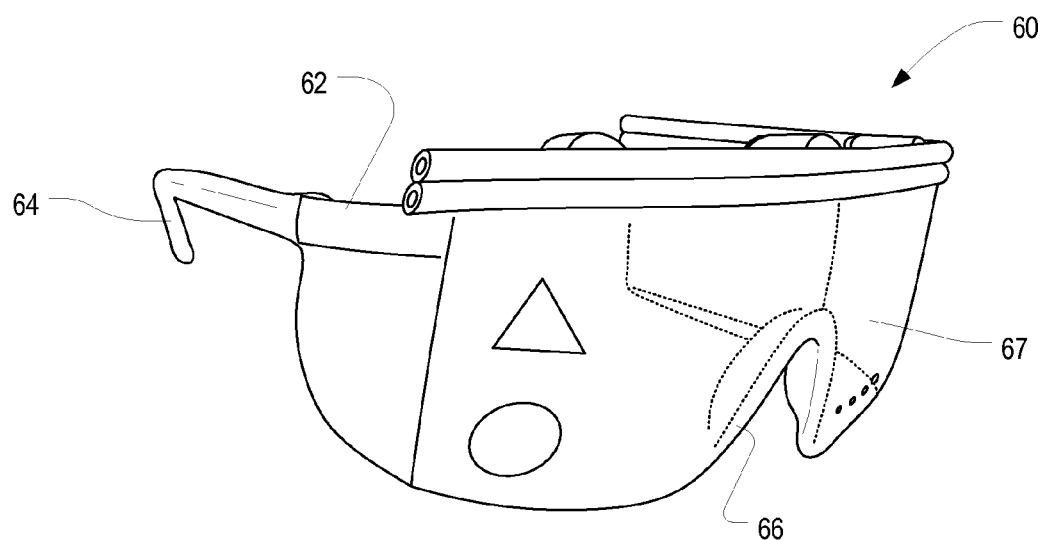
FIG. 5 is a front right perspective view of the head-mounted user interface device of FIG. 1.
Figure 6:
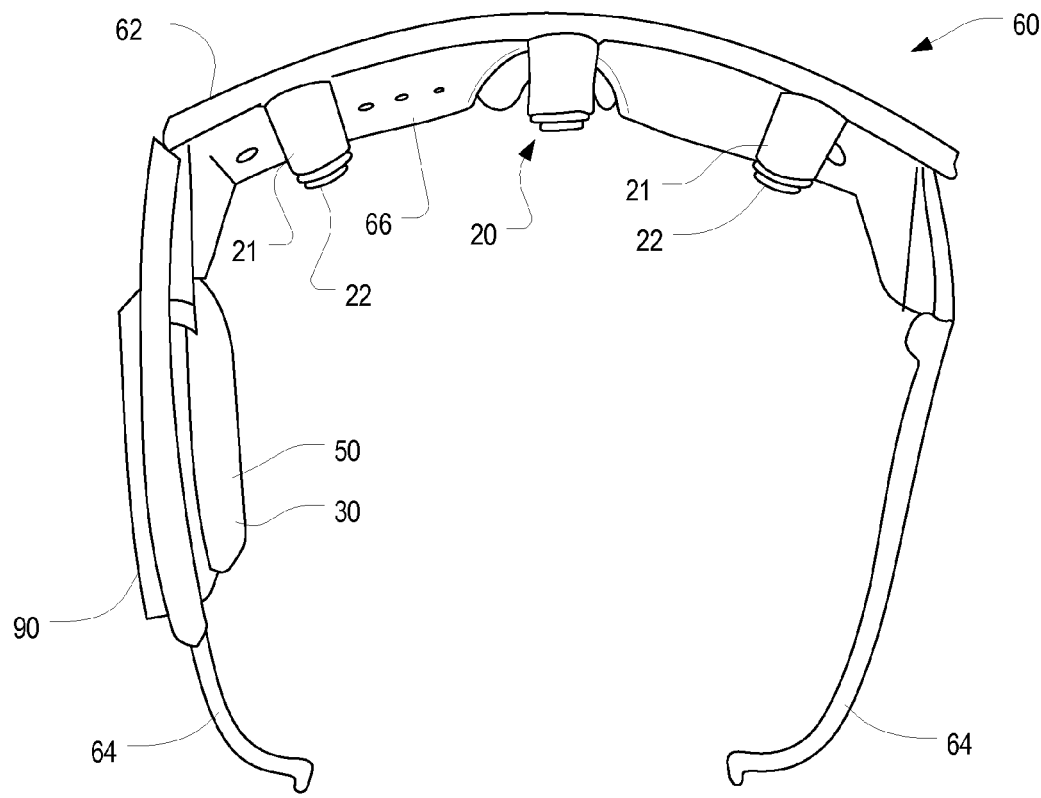
FIG. 6 is a top perspective view of the head-mounted user interface device of FIG. 1.

In at least some embodiments, each electrode 20 has an electrode input surface 22, which is the surface of the electrode that makes contact with the user's cranium 11, that is supported by an electrode stem 21. In various embodiments of the present invention, the electrode stem 21 is supported by an electrode arm 24 described below. FIG. 3 is a front perspective view of the head-mounted user interface device 60 of FIG. 1; FIG. 4 is a left side perspective view of the head-mounted user interface device 60 of FIG. 1; FIG. 5 is a front right perspective view of the head-mounted user interface device 60 of FIG. 1; and FIG. 6 is a top perspective view of the head-mounted user interface device 60 of FIG. 1. As shown therein, the electrodes 20 may be integrated into the controller glasses 61. In the arrangement shown in FIGS. 3-6, the electrodes 20 are carried on the frame support 62 such that each electrode 20 is attached to the user's cranium 11 via the flexible electrode stem 21. Each electrode stem 21 may be comprised of a flexible material, spring or other, so as to provide a resistive force, which automatically adjusts to the contour's of the user's cranium 11. Resistant spring tension may be utilized to allow the electrode input surface 22 to maintain physical contact with the user's cranium 11.

The electrodes 20 are connected to a multi-signal neural interface amplifier 30, which are adapted to receive, process, and amplify a plurality of brain-body signals, which are generated by the user 10 and received or captured by the electrodes 20. In at least some embodiments, the multi-signal neural Interface amplifier 30 is attached to the electrodes 20 via the electrode stem 21 and or electrode support arm 24 and receives processes and amplifies electrical brain/body signals which are captured by the electrodes 20. The multi-signal neural interface amplifier 30 may be attached directly to the electrodes 20 or connected via wire or other electrical connection. The multi-signal neural interface amplifier 30 may transmit data to a processor 31 or computer via wire or transmitted wirelessly.

The signals produced by the multi-signal neural interface amplifier 30 are processed and calibrated automatically by the application software 43, loaded on the glasses device processor(s) 31. Under control of the processor 31, the remote control transmitter 32 then transmits processed control data in a plurality of broadcasted signals to the controllable device 80. Power to the various electrical components is provided by the power supply 90, which may include a battery, charging circuit, and the like, according to the electrical requirements of the various components or subsystems.

The controllable device 80 is a multi-action machine or mechanical device, vehicle, robot, toy, or electrical device, electrical system or software program that can perform multiple actions or movements that the user 10 wishes to operate. The controllable device 80 may have an electrical motor machine or mechanical systems which are typically contained in items such as in a vehicle, robot, object or toy that the user 10 wishes to operate and or control remotely without manual means. As used herein, the term "electronic device" may be used to designate any device that has a microprocessor and that needs controlling. This includes, but is not limited to computers, mobile phones, video game systems, toys, robots, vehicles, home-theater systems, industrial machinery, medical equipment, household appliances as well as light fixtures. Multi-action machines may be assembled from components or machine elements and consist of mechanisms that control movement in various ways. Elements includes but are not limited to gear trains, transistor switches, belt or chain drives, linkages, motors, lights, action systems, cam and follower systems, brakes and clutches, and structural components such as frame members and fasteners. Other machines include sensors, actuators and computer controllers.

Figure 7A:
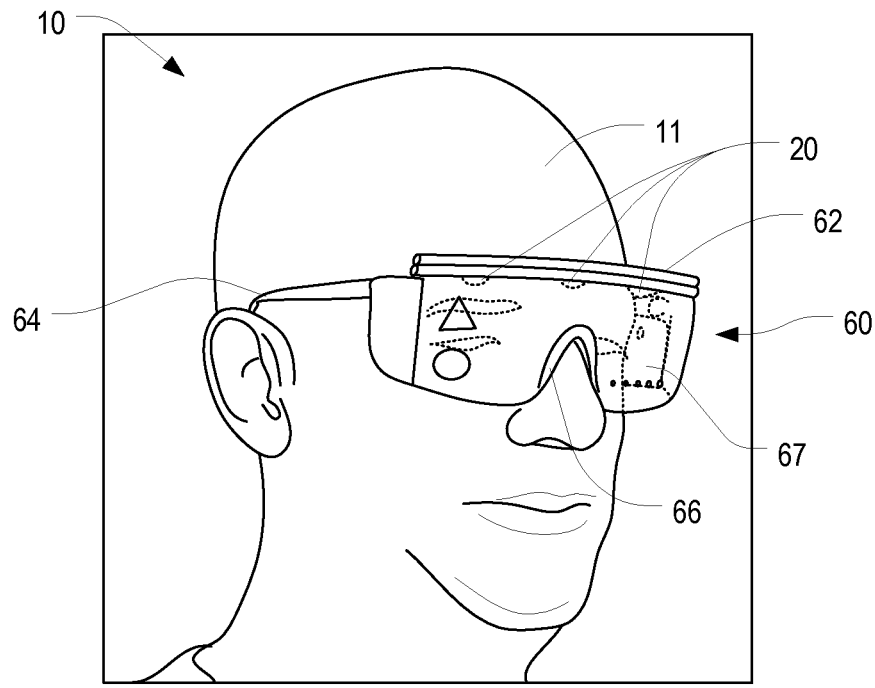
FIGS. 7A and 7B are right and left side perspective views of the head-mounted user interface device mounted on a human user.
Figure 7B:
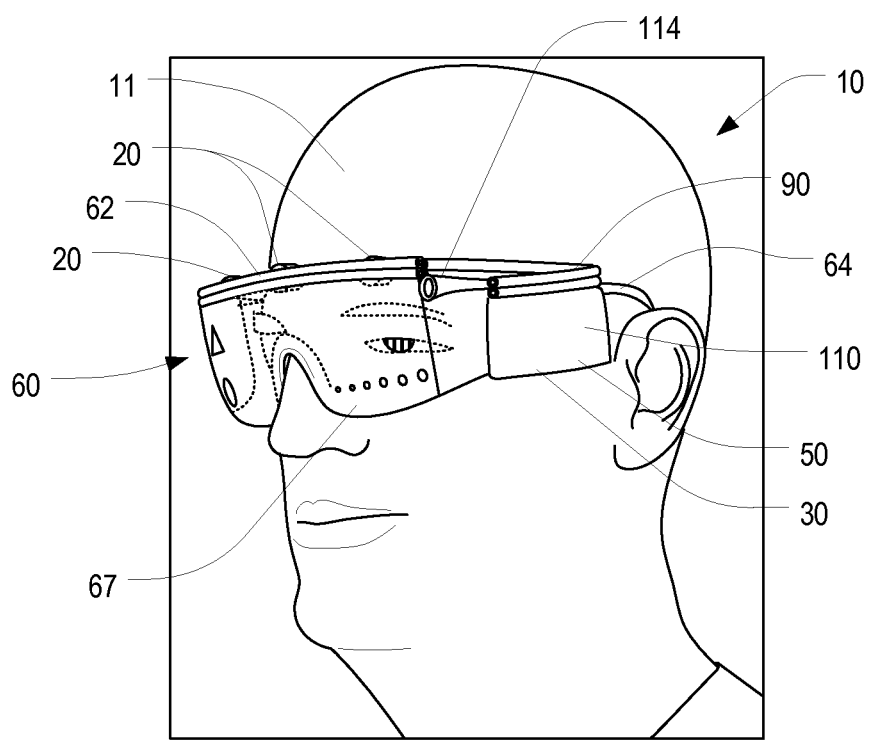

In operation, the head-mounted user interface device 60 is installed or mounted on the user 10. In the illustrated embodiments, the user 10 is a human and the head-mounted user interface device 60 is installed or mounted on the cranium 11 of the user 10 because the cranium 11 is the body part that contains the user's brain which generates various mind-signals. In this regard, FIGS. 7A and 7B are right and left side perspective views of the user interface device 60 mounted on a human user 10. However, it will be appreciated that the user 10 may be any biological being or living organism that produces electrical signals and wishes to remotely control a machine, electronic device or software by generating and using brain/body signals and motion signals and biosignals. The User 10 can be of varied, male or female of any age. The user 10 may be a mammal or reptile, person, human; life-form or a being that produces signals.

Once the controller glasses 61 are placed on the user 10, the electrodes 20 are connected to the user's cranium 11, and the system 100 starts receiving data in the form of multiple bioelectric signals. These bioelectric signals are then received, processed, and then amplified by the multi-signal neural interface amplifier (NIA) 30. A controllable device such as a car 80 then receives via a wireless connection the data from the NIA 30, which is then used to control the car 80 or any like controllable device. Control signals may be provided, for example, to cause the car 80 of FIG. 1 to move forward or backward via on-board motor 81, turn left or right, or activate lights 82 or other on-board electrical devices.

Figure 8:
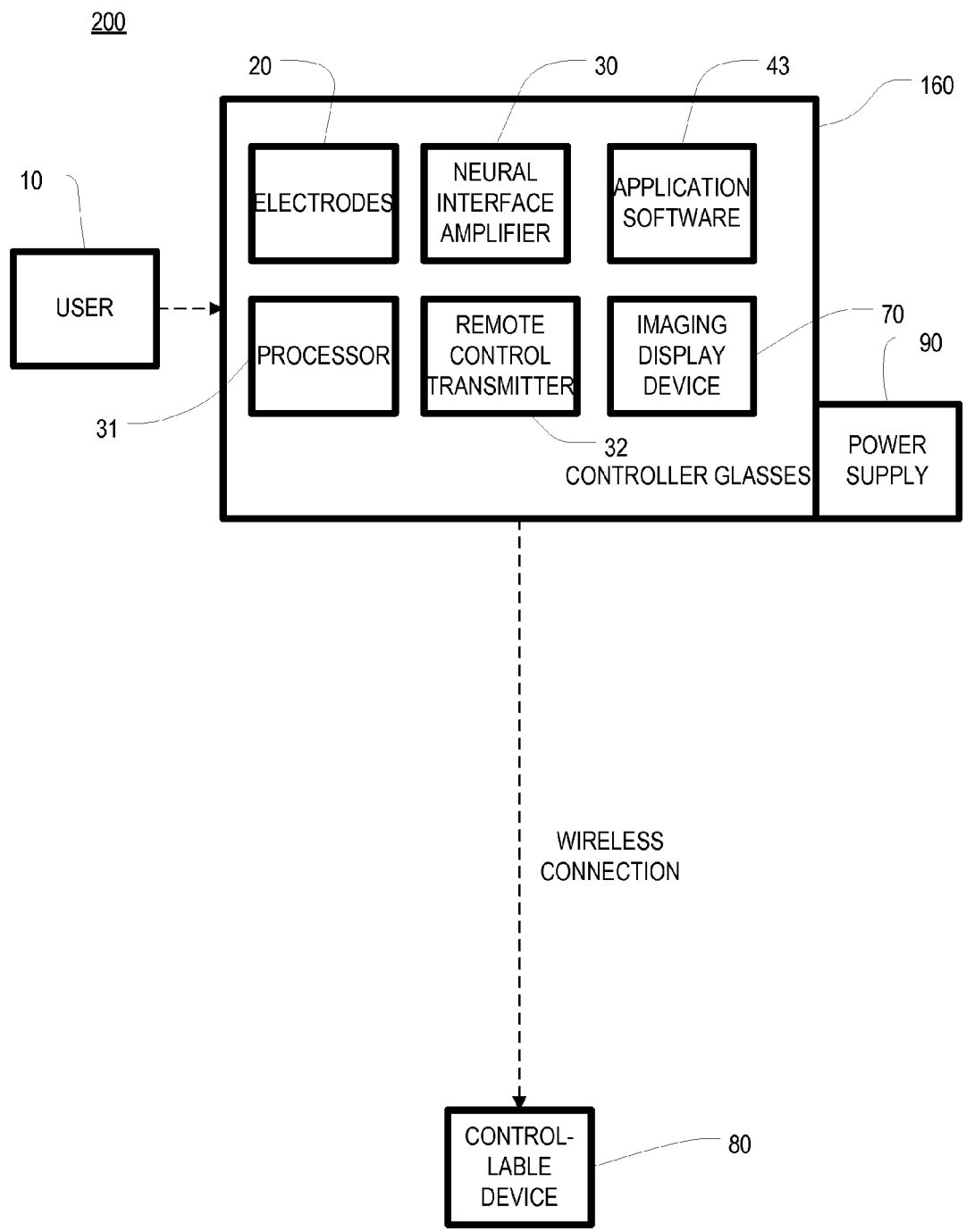
FIG. 8 is a block diagram of a system employing a plurality of brain/body-generated inputs to control the multi-action operation of a controllable device in accordance with another preferred embodiment of the present invention.
Figure 9A:
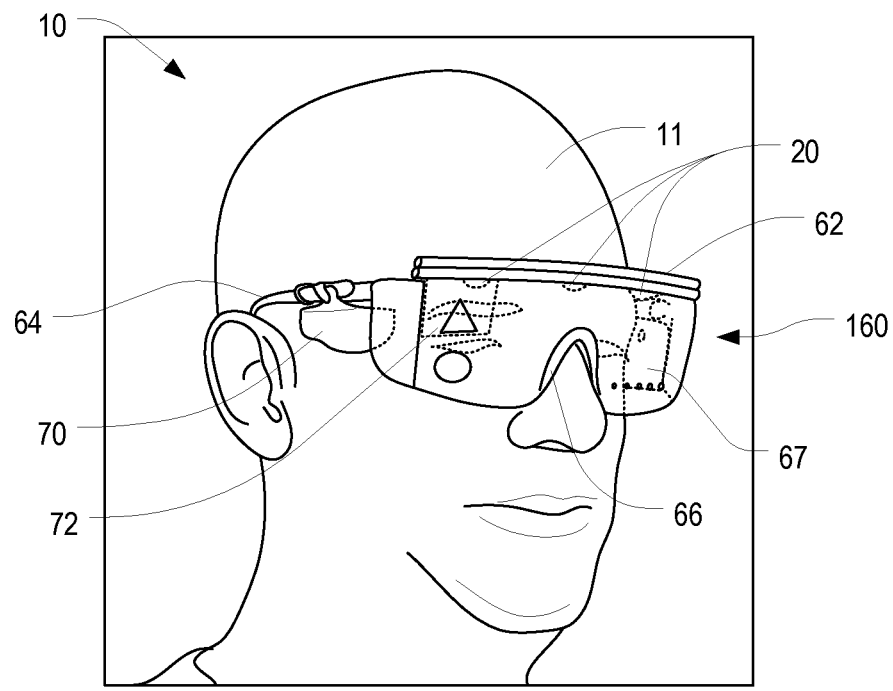
FIGS. 9A and 9B are right and left side perspective views of a user wearing the head-mounted user interface device of FIG. 8.
Figure 9B:
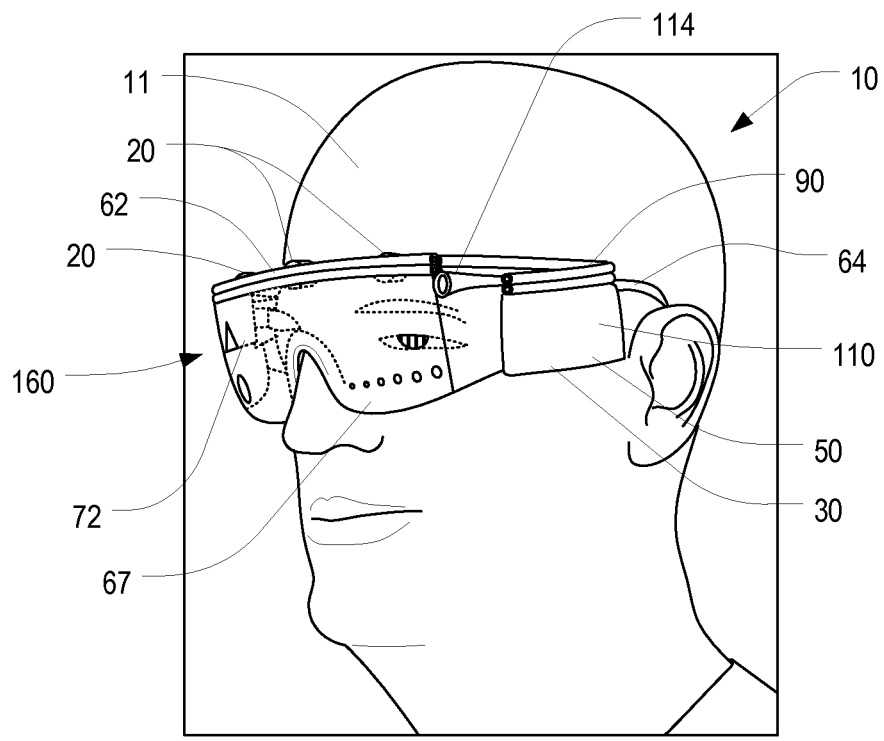
Figure 10:
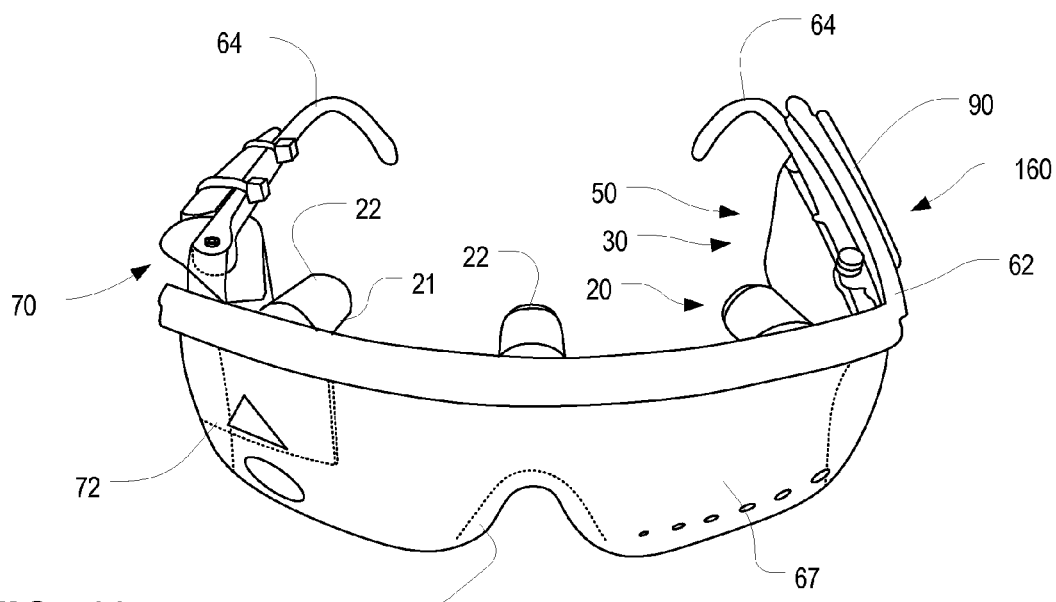
FIG. 10 is a front perspective view of the head-mounted user interface device of FIGS. 9A and 9B.
Figure 11:
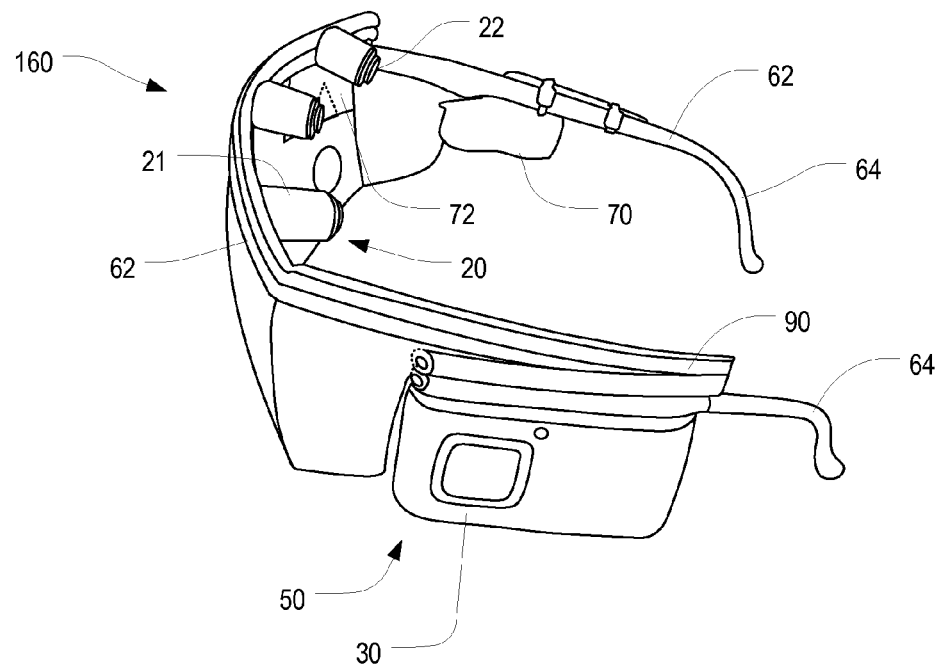
FIG. 11 is a left side perspective view of the head-mounted user interface device of FIGS. 9A and 9B.
Figure 12:
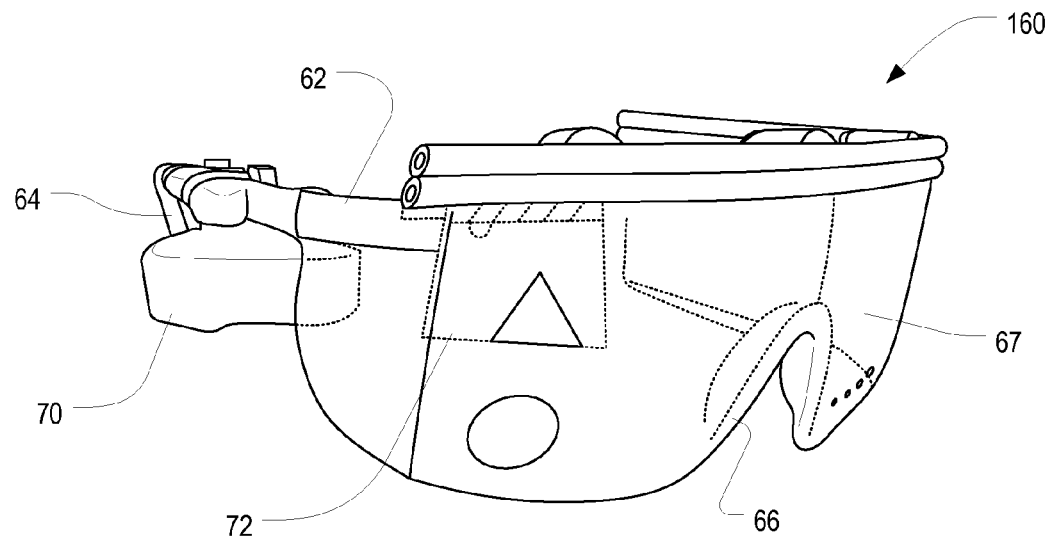
FIG. 12 is a front right perspective view of the head-mounted user interface device of FIGS. 9A and 9B.
Figure 13:
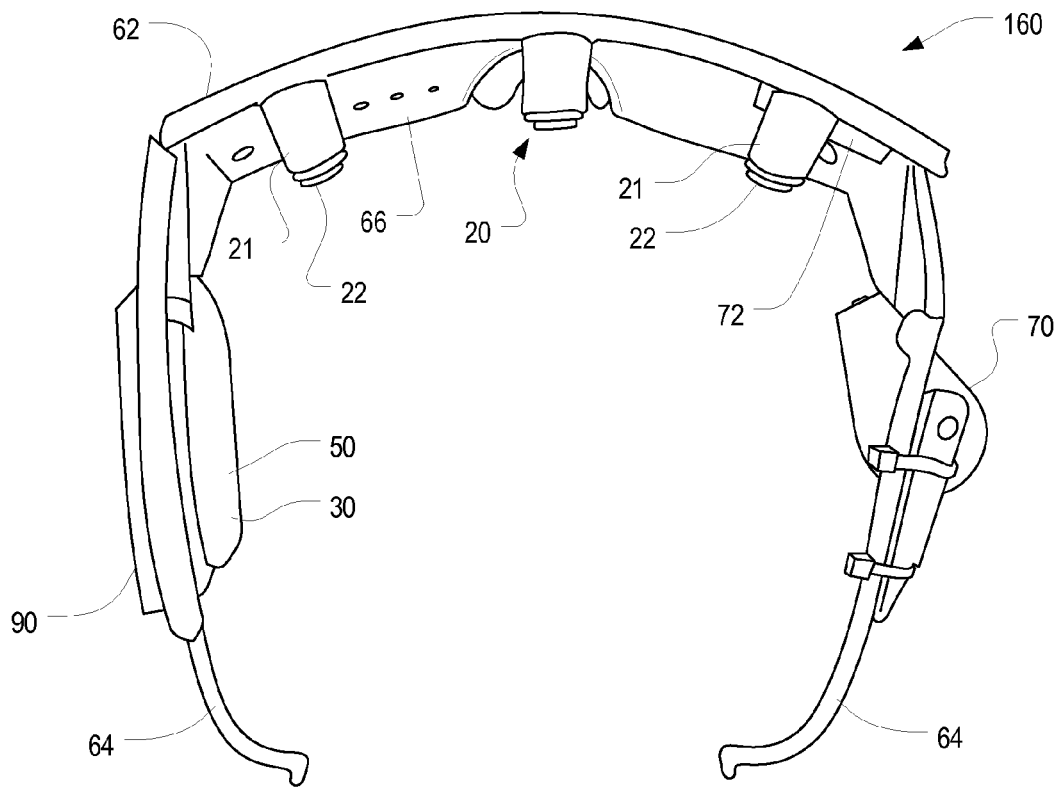
FIG. 13 is a top perspective view of the head-mounted user interface device of FIGS. 9A and 9B.

FIG. 8 is a block diagram of a system 200 employing a plurality of brain/body-generated inputs to control the multi-action operation of a controllable device 80 in accordance with another preferred embodiment of the present invention, and FIGS. 9A and 9B are right and left side perspective views of a user 10 wearing the head-mounted user interface device 160 of FIG. 8. The system 200 of FIG. 8, and the head-mounted user interface device 160 of FIGS. 8, 9A, and 9B are somewhat similar to the system 100 and user interface device 60 of FIGS. 1 and 2, but further include an image display system 70. In at least some embodiments, the image display system 70 includes a controller/projector 71 and a screen 72. Such an arrangement is shown in FIGS. 10-13, which are a front perspective view, a left side perspective view, a front right perspective view, and a top perspective view of the head-mounted user interface device 160 of FIGS. 9A and 9B.

The image display system 70 is a head-mounted display (HMD) imaging display device that a person wears on the head in order to have images or video information directly displayed in front of the eyes. The image display system 70 may include either one or two small CRT, LCD or OLED displays 72 with magnifying lenses and other associated optical elements. The display(s) 72 and optics are embedded in the head-mounted user interface device 160. The image display system 70 may be configured as binocular HMDs for dual eye use. HMDs may also be configured as monocular HMDs for single eye use. The image display system 70 can be used to view a see-through image imposed upon a real world view, thereby creating what is typically referred to as an augmented reality. The augmented reality can be combined with the stereoscopic images in various types of applications. Some examples include applications in surgery, where radiographic data, such as CAT scans or MRI imaging can be combined with the surgeon's vision. Military, computer gamers, police and firefighters use HMDs to display relevant tactical information, such as maps or thermal imaging data. Using the image display system 70, or a display on another device, the user may view the data corresponding to or representative of their brain/body and motion electrical signals.

In use, the user 10 places the controller glasses 61 on user's cranium 11, and the controller glasses 61 have integrated electrodes 20, multi-signal neural interface amplifier 30, processor(s) 31, image display system 70, application software 43 and a wireless transmitter 32 which are all connected together as one unit. The plurality of user generated brain-body signals, received by the electrodes 20, amplified by the multi-signal neural interface amplifier 30 are processed and calibrated automatically by the application software 43 and loaded on the controller's processor(s) 31. The head-mounted user interface device 160 then transmits processed control data in a plurality of broadcasted signals to the controllable device 80. The user 10 may also control software applications, which are displayed by the image display system 70 in the controller glasses 61. The user 10 may also view images which are received by the head-mounted user interface device 160 and displayed by the imaging display device in the controller glasses 61. The controllable device can then be operated pursuant to the signals received by the Controller Glasses. The entire system is electrically powered via power supply 90, pending the given sub-systems electrical requirements.

Figure 14:
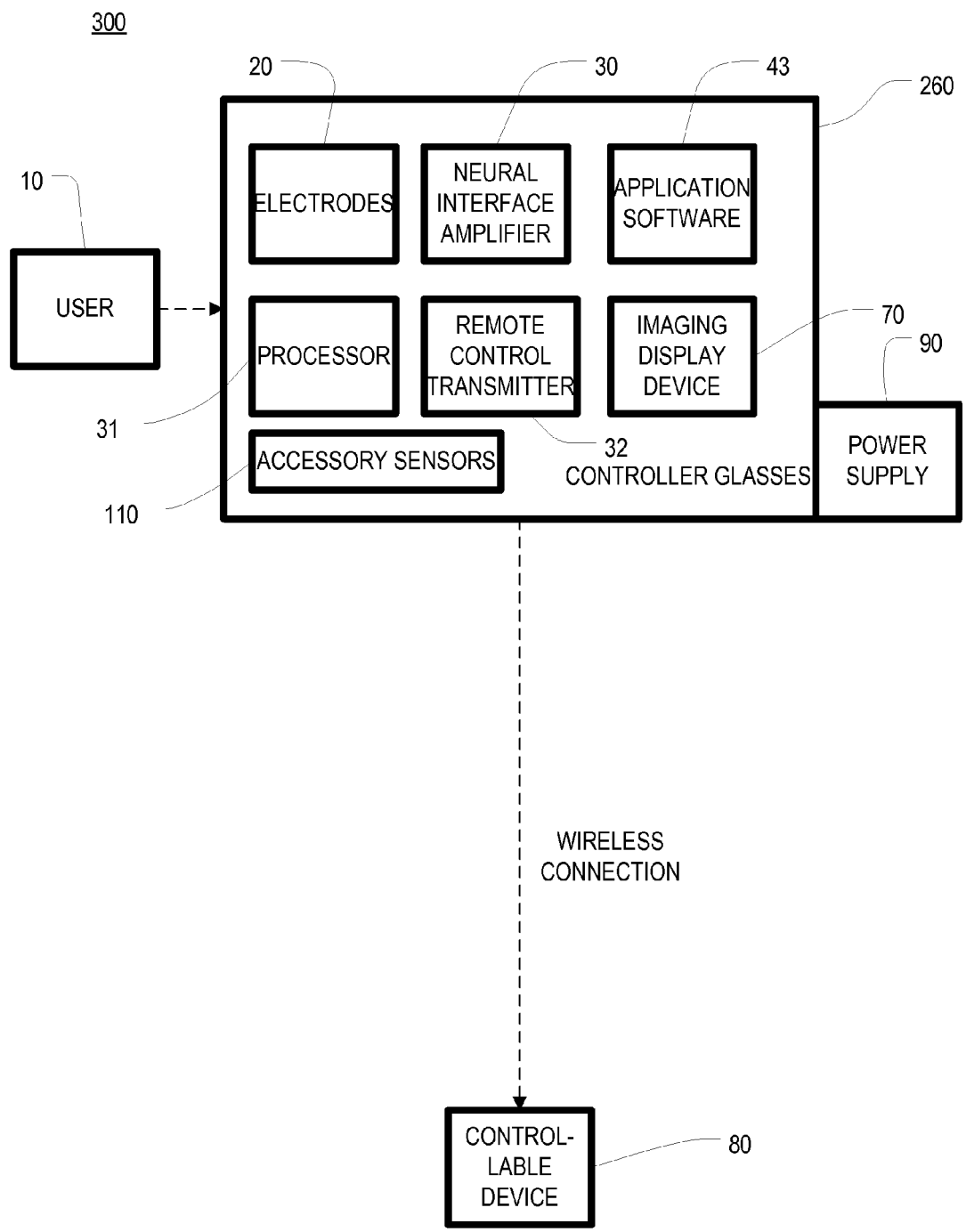
FIG. 14 is a block diagram of a system employing a plurality of brain/body-generated inputs to control the multi-action operation of a controllable device in accordance with another preferred embodiment of the present invention.
Figure 15:
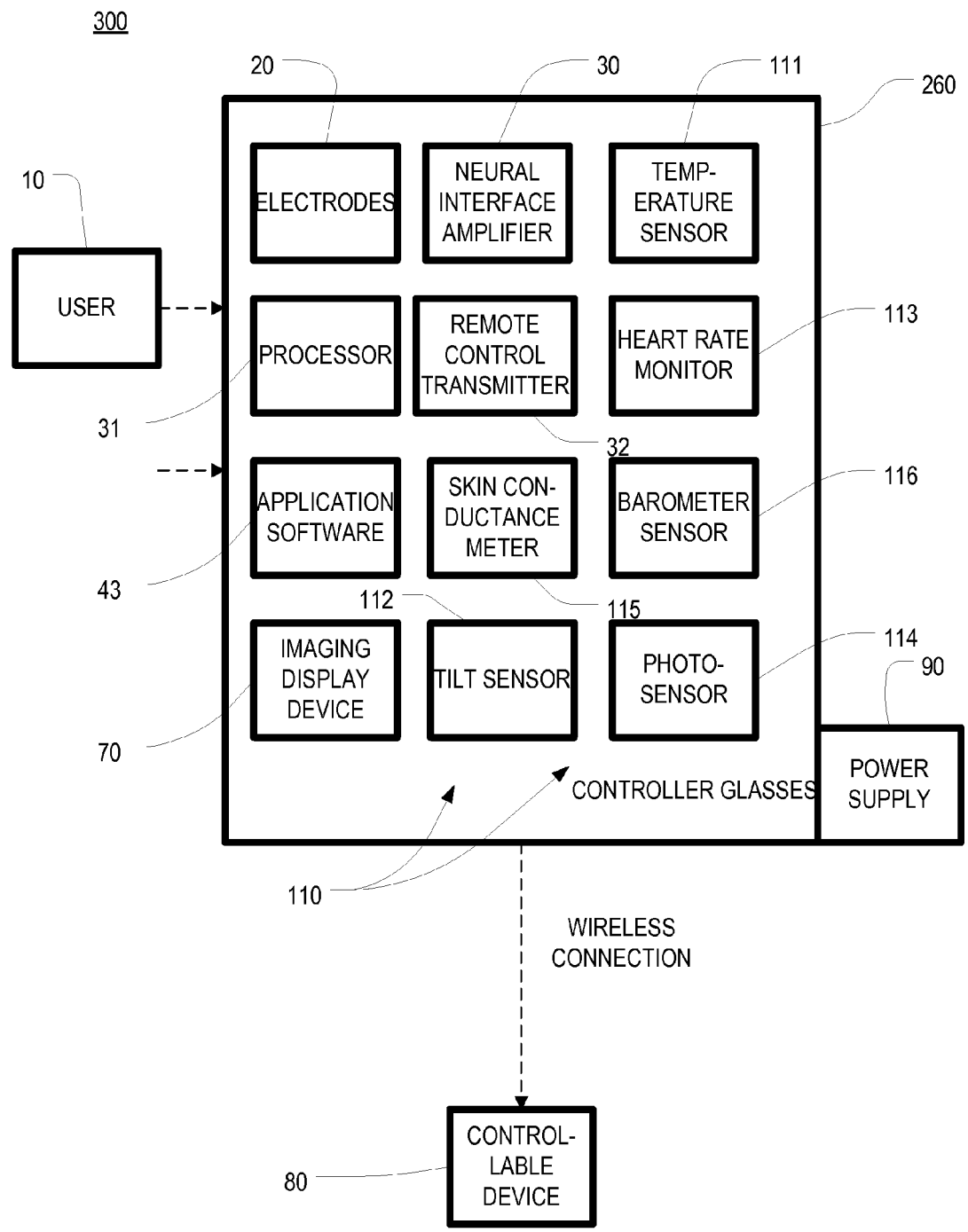
FIG. 15 is a block diagram of the system of FIG. 14, illustrating a particular set of accessory sensors.
Figure 16:
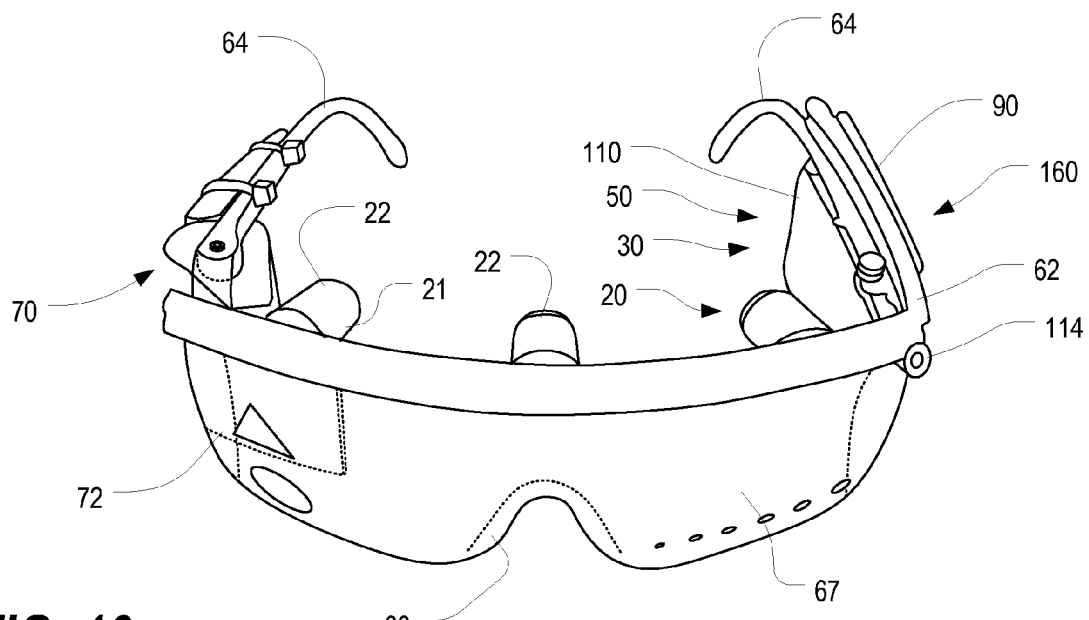
FIG. 16 is a front perspective view of the head-mounted user interface device of FIGS. 14 and 15.
Figure 17:
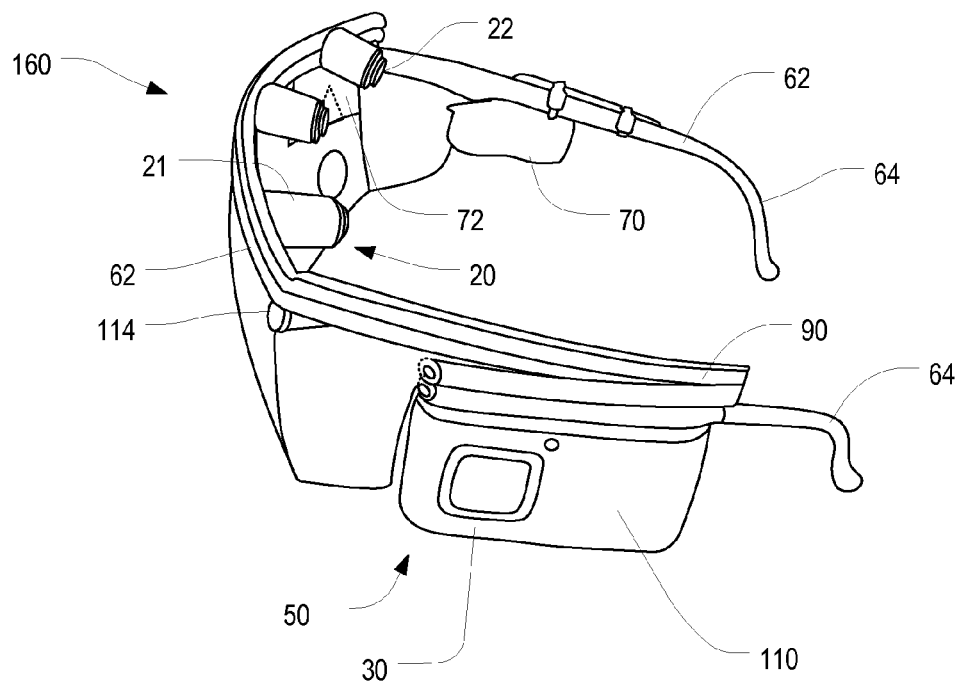
FIG. 17 is a left side perspective view of the head-mounted user interface device of FIGS. 14 and 15.
Figure 18:
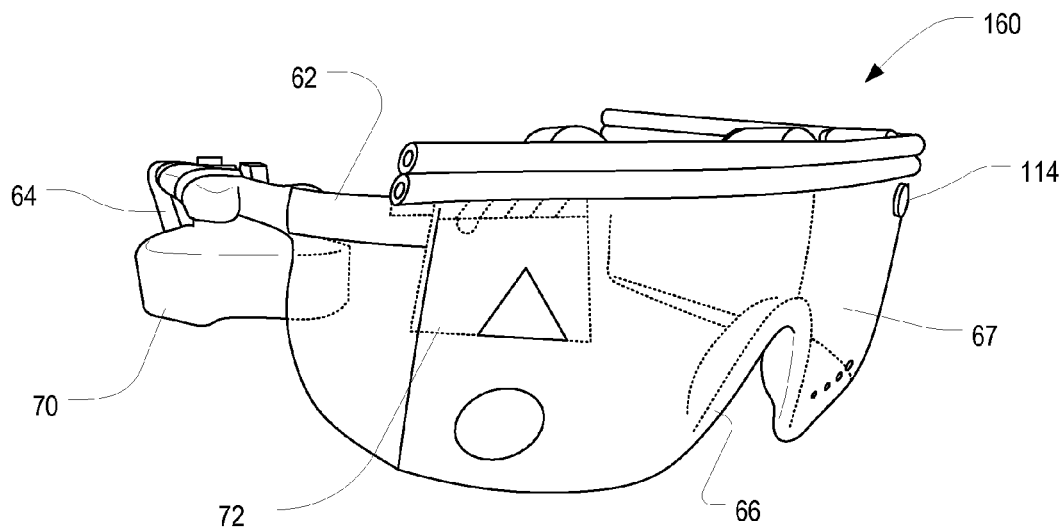
FIG. 18 is a front right perspective view of the head-mounted user interface device of FIGS. 14 and 15.
Figure 19:
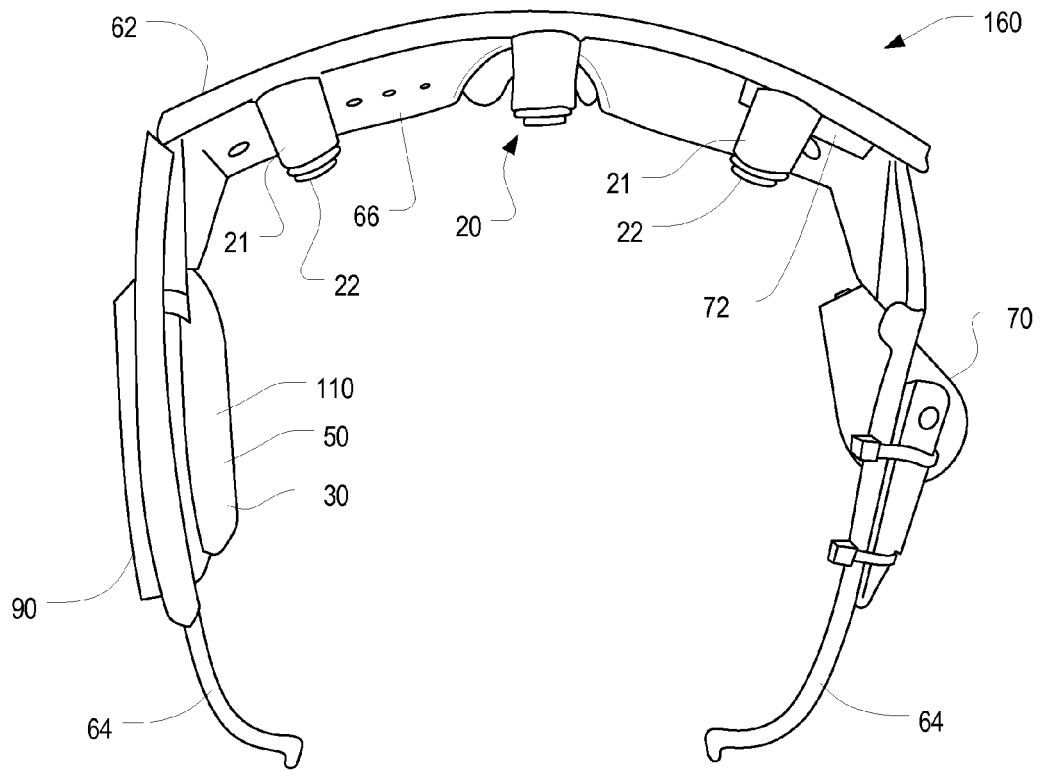
FIG. 19 is a top perspective view of the head-mounted user interface device of FIGS. 14 and 15.

FIG. 14 is a block diagram of a system 300 employing a plurality of brain/body-generated inputs to control the multi-action operation of a controllable device 80 in accordance with another preferred embodiment of the present invention, and FIG. 15 is a block diagram of the system 300 of FIG. 14, illustrating a particular set of accessory sensors 110. The system 300 of FIGS. 14 and 15 is somewhat similar to the system 100 and user interface device 60 of FIGS. 1 and 2, but further includes one or more accessory sensors 110. The accessory sensors 110, which may be housed in the head-mounted user interface device 260, monitor biosignal, biometric, or movement signal data which are produced by the user 10 or surrounding environmental data. Accessory sensors 110 may be such sensors as temperature sensors 111, heart rate sensors 113, photosensors 114, skin conductive sensors 115, barometer 116 and tilt sensors 112. Such accessory sensors 110 provide signal data to the computer or processor 31 for the computer to process said data together with user brain/body signals, in various manners to operate a controllable device 80. FIGS. 16-19 are a front perspective view, a left side perspective view, a front right perspective view, and a top perspective view of the head-mounted user interface device 260 of FIGS. 14 and 15.

In at least some embodiments, the tilt sensor 112 is an inertial sensor, accelerometer, rotation sensor, gyroscope, inclinometer, clinometer, guidance system, tilt indicator, slope alert, slope gauge, gradient meter, gradiometer, level gauge, level meter, declinometer, pitch & roll indicator or any motion sensing device/mechanism used to continuously calculate the position, orientation, and velocity (direction and or speed of movement) of the controllable glasses 61 without the need for external references. The tilt sensor 112 may be a one-axis, or multiple axis tilt sensor. The tilt sensor 112 provides positioning data to the glasses processor or computer 31. The tilt sensor 112 monitors the motions of the user's head or body, generating data for the computer or processor 31 that commands the controllable device 80 based on the monitored motions of user's head or body.

In at least some embodiments, the temperature sensor 111 monitors the user's body temperature, the heart rate sensor 113 monitors and measures the user's heart rate in real time, and the photosensors or photodetectors 114 are sensors of ambient light, light or other electromagnetic energy.

In at least some embodiments, the skin conductance sensor 115 measures the electrical conductance of the skin, which varies with its moisture level. The skin conductance sensor 115 measures moisture levels of sweat glands which are controlled by the sympathetic nervous system of the user 10. Skin conductance signal data may be used as an indication of psychological or physiological arousal of the user 10.

In at least some embodiments, the barometer 116 is a sensor to measure atmospheric pressure and also provides signal data to the processor 31.

Other accessory sensors may include sonar sensors, compass sensors, optical distance sensors, and others. In at least some embodiments, sonar sensors use sound propagation to navigate, communicate with or detect objects. In at least some embodiments, compass sensors are navigational instruments that measure directions in a frame of reference that is stationary relative to the surface of the earth. In at least some embodiments, optical distance sensors utilize laser and light detecting and ranging sensors (LIDAR) or light detection and ranging (LADAR) to measure the distance to, or other properties of, targets, usually by illuminating the target with laser light and analyzing the back-scattered light.

In at least some embodiments a microphone may be provided. A microphone is an acoustic-to-electric transducer or sensor that converts sound into an electrical signal.

The above mentioned accessory sensors 110 provide signal data to the computer or processor 31 for processing of the said signal data together with acquired user brain/body signals. Once acquired by the processor 31, these accessory signals 110 may then be used singularly, in various separated signal bands or combinations, in various manners to direct and operate a controllable device 80.

Figure 20:
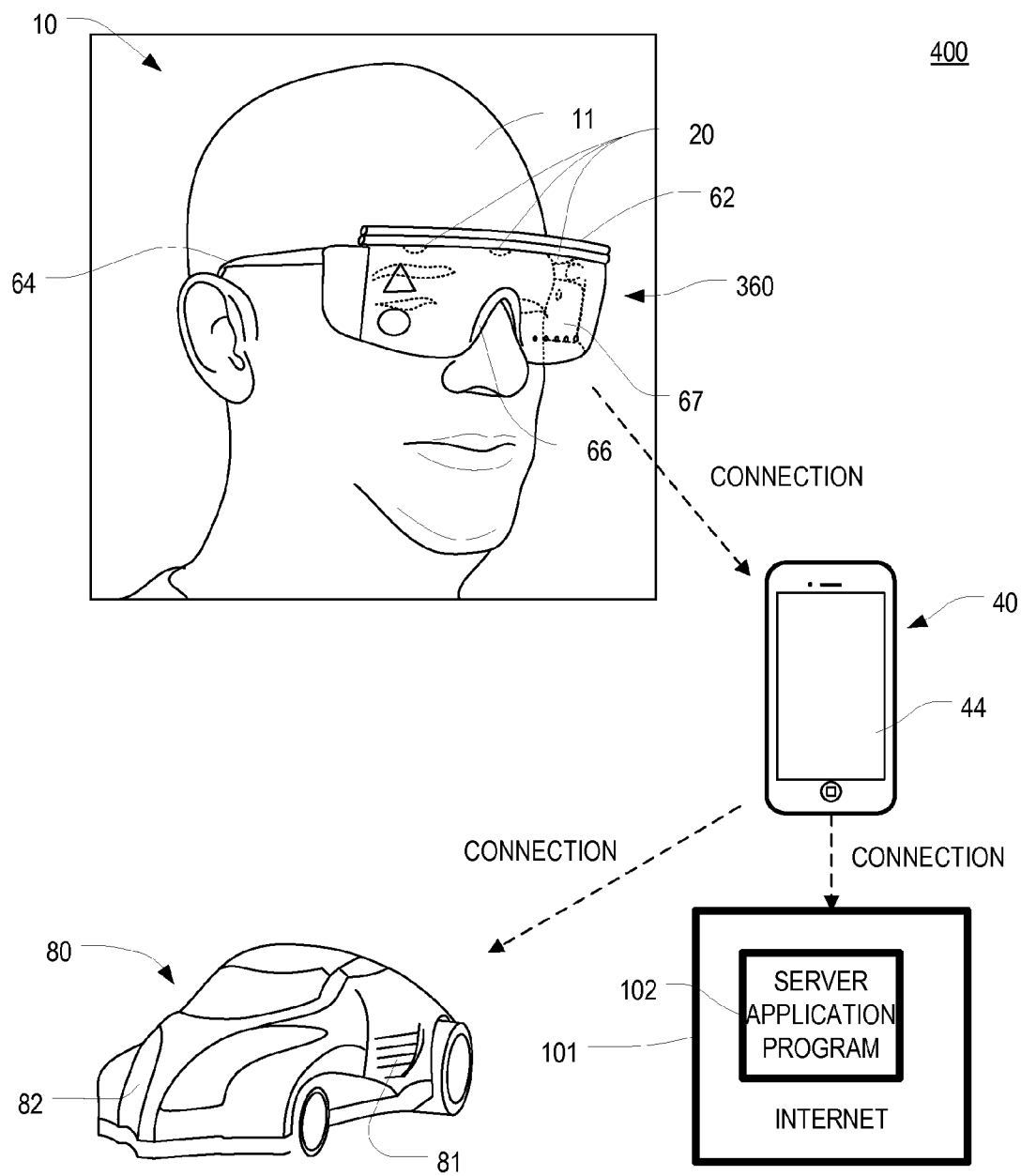
FIG. 20 is a partially perspective view of a system employing a plurality of brain/body-generated inputs to control the multi-action operation of a controllable device in accordance with another preferred embodiment of the present invention.
Figure 21:
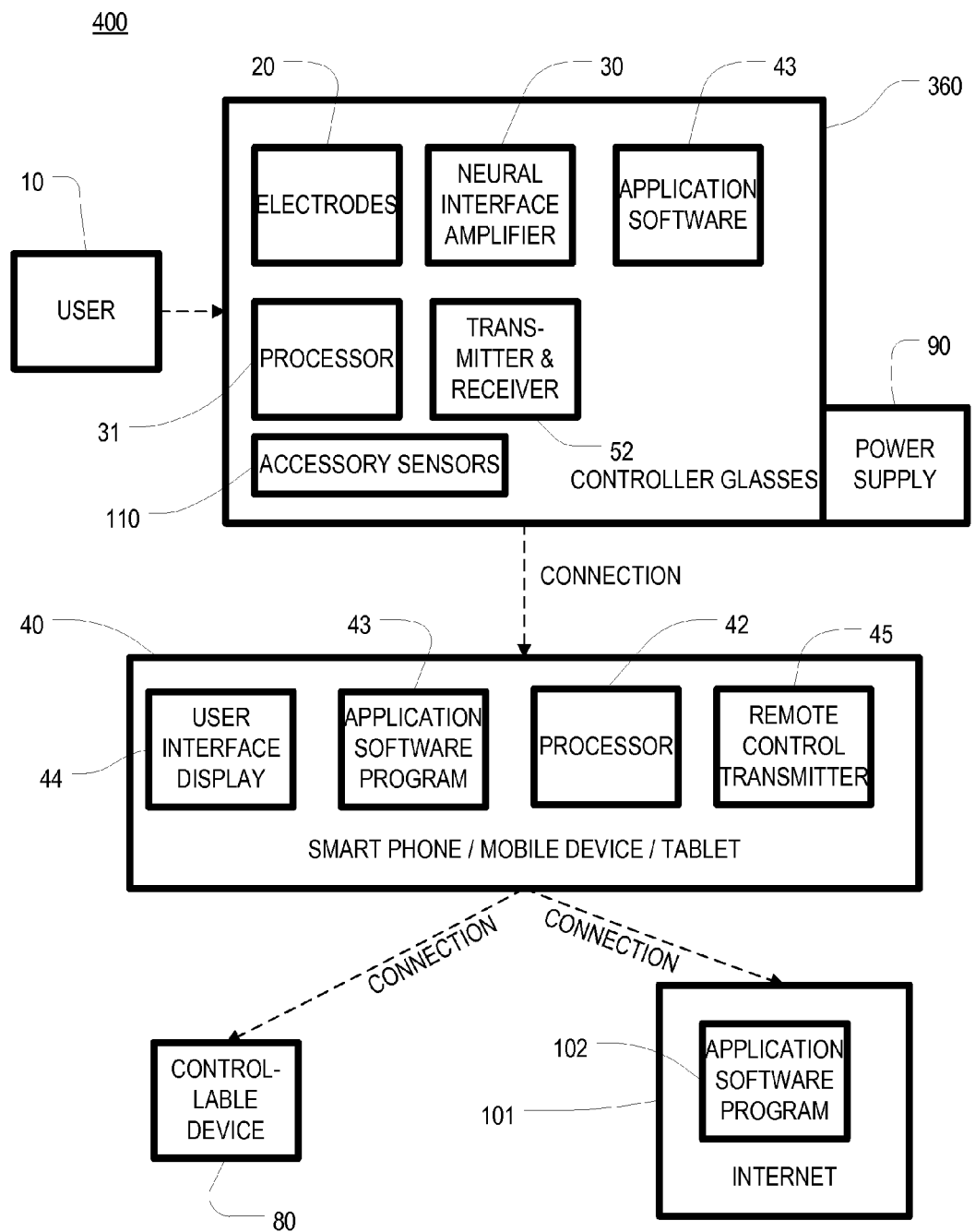
FIG. 21 is a block diagram of one implementation of the system of FIG. 16.

FIG. 20 is a partially perspective view of a system 400 employing a plurality of brain/body-generated inputs to control the multi-action operation of a controllable device 80 in accordance with another preferred embodiment of the present invention, and FIG. 21 is a block diagram of one implementation of the system 400 of FIG. 20. As shown therein, the system 400, which in at least some embodiments may be completely wireless, includes a head-mounted user interface device 360, worn on the head of a user 10, that communicates with a computer device 40, which may for example be a mobile device, to control the operation of a device 80, via wireless connection, on the basis of input captured or received directly from the head of the user 10 by one or more electrodes 20.

The head-mounted user interface device 360 is somewhat similar to the user interface device 260 of FIGS. 14 and 15, but does not include an image display system 70, and rather than including a remote control transmitter that might be specific or dedicated to communications with the controllable device 80, the device 460 includes a general purpose transmitter and/or receiver 52 that communicates with the computer device 40.

The computer device 40 may be a general purpose device which can be programmed to carry out a set of arithmetic or logical operations. In at least some embodiments, the computer device 40 includes a processor 42, one or more application software program 43, a user interface display 44, and one or more transmitter and/or receiver 45. The computer device 40 receives and processes data from electrodes 20 and accessory sensors 110 and interacts with application software program(s) 43 loaded onto the computer device 40. The application software program(s) are used to control, view and take action on the data provided by the electrodes 20 and accessory sensors 110. The computer device 40 may be used to process and map the user-generated brain/body, biosignal, motion, or environmental, biosignal data to multiple machine actions. The computer device 40 generates commands for the controllable device 80, preferably from a selection of commands, based on a single or a combination of monitored brain/body signals, body motions and or monitored biosignal data of the user 10. The computer device 40 can be a computer, laptop computer, smart phone, tablet, other mobile device, or any device which has a processor which data and software can be loaded, operated and processed.

To use the system 400 of FIGS. 20 and 21, the user 10 places the head-mounted user interface device 360 on the user's cranium 11. The head-mounted user interface device 360 has integrated electrodes 20, accessory sensors 110, a multi-signal neural interface amplifier 30, processor(s) 31, application software 43, transmitter and receiver 52, all of which may be connected together as one unit, although in at least some embodiments the unit may be separated into more than one housing. The controller glasses 61 then wirelessly connects to the computer device 40 so the computer device 40 can receive process and calibrate the plurality of brain-body signals and accessory signal data generated by user 10. The computer device 40 then wirelessly transmits a plurality of command signals to the controllable device 80 shown as a car 80 in FIG. 20.

The computer device 40 may also communicate with a server application program 102, accessible via the internet 101, for access and use of data and software not located on the computer device 40. In this regard, the internet or internet cloud is a global system of interconnected computer networks that use the standard internet protocol suite (often called TCP/IP, although not all applications use TCP) to serve billions of users worldwide. It is a network of networks that consists of millions of private, public, academic, business, and government networks, of local to global scope, that are linked by a broad array of electronic, wireless and optical networking technologies. The computer device 40, and by extension the controller glasses 61, may connect to the internet via Internet Connection Method and utilize server application programs and receive data which may then be utilized by the user 10. The Internet Connection Method can be any connection technology to connect to the internet, including but not limited to WiFi, bluetooth, phone, or hardline connection to the internet.

The entire system is electrically powered via power supply 90, pending the given sub-systems electrical requirements.

Figure 22:
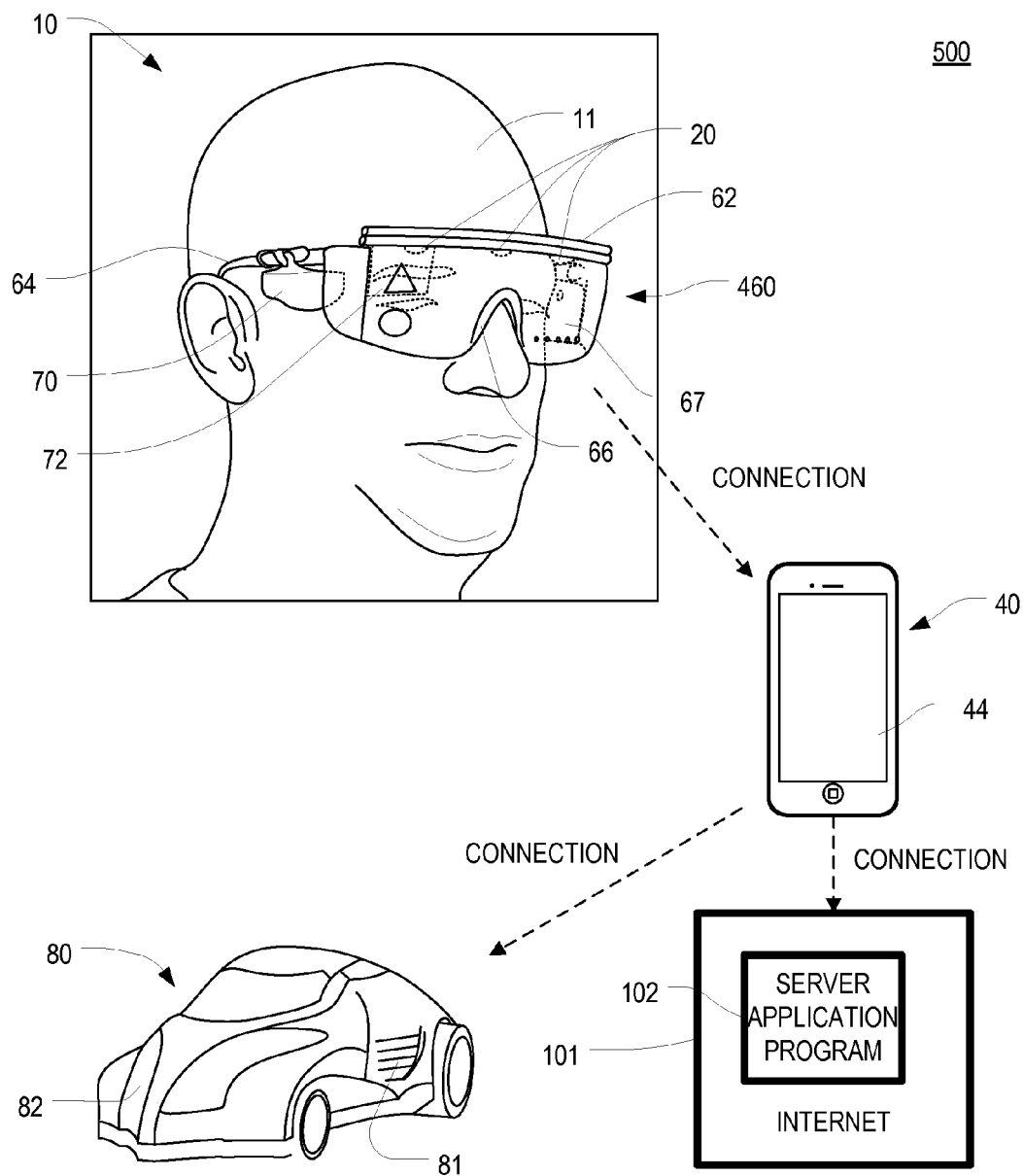
FIG. 22 is a partially perspective view of a system employing a plurality of brain/body-generated inputs to control the multi-action operation of a controllable device in accordance with another preferred embodiment of the present invention.
Figure 23:
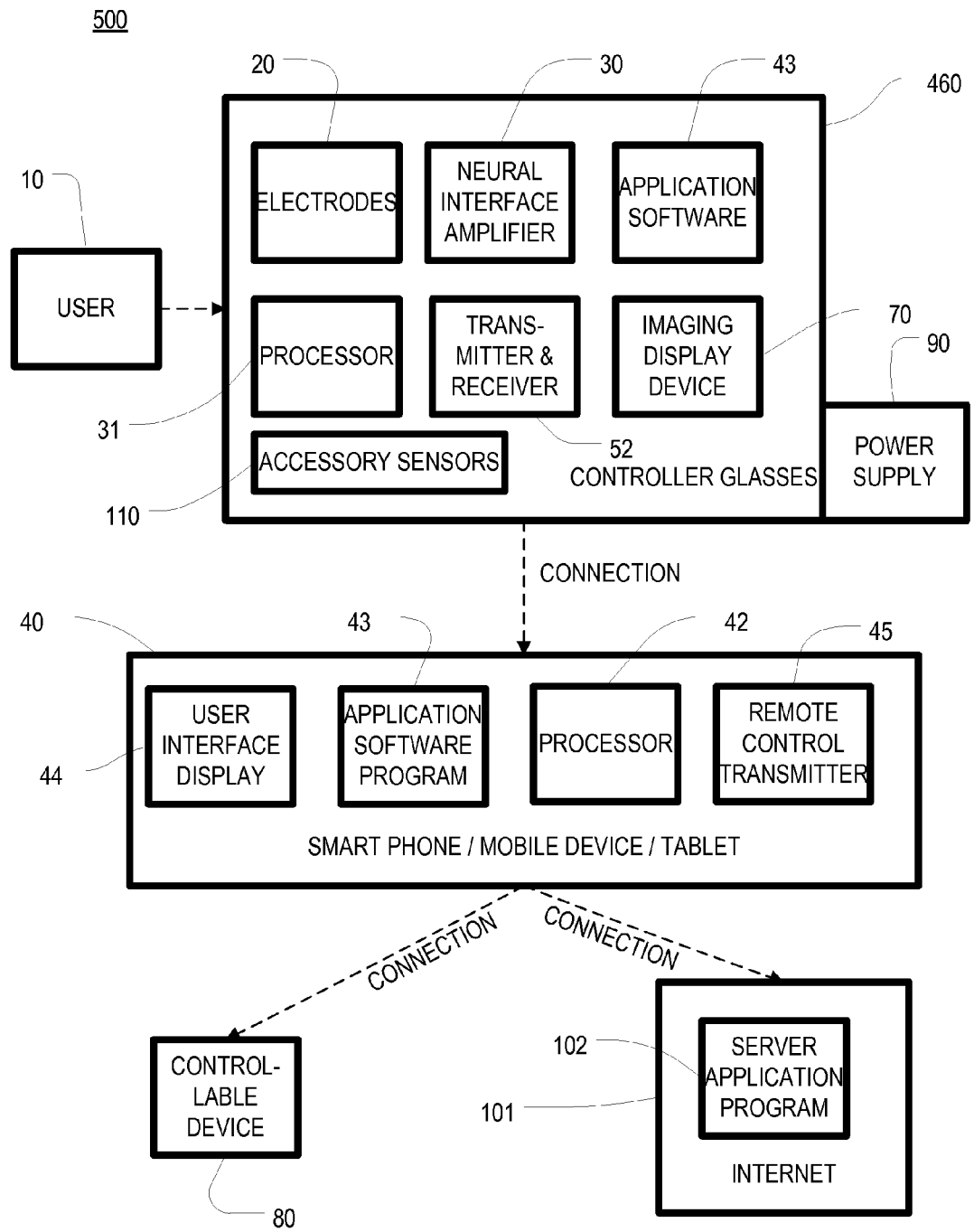
FIG. 23 is a block diagram of one implementation of the system of FIG. 22.

FIG. 22 is a partially perspective view of a system 500 employing a plurality of brain/body-generated inputs to control the multi-action operation of a controllable device 80 in accordance with another preferred embodiment of the present invention, and FIG. 23 is a block diagram of one implementation of the system 500 of FIG. 22. As shown therein, the system 500, which in at least some embodiments may be completely wireless, includes a head-mounted user interface device 460, worn on the head of a user 10, that communicates with a computer device 40, which may for example be a mobile device, to control the operation of a device 80, via wireless connection, on the basis of input captured or received directly from the head of the user 10 by one or more electrodes 20. The head-mounted user interface device 460 is somewhat similar to the user interface device 360 of FIGS. 20 and 21, but further includes an image display system 70 similar to that of FIGS. 9A and 9B.

To use the system 500 of FIGS. 22 and 23, the user 10 places the head-mounted user interface device 460 on user's cranium 11. The head-mounted user interface device 460 has integrated electrodes 20, accessory sensors 110, multi-signal neural interface amplifier 30, processor(s) 31, application software, transmitter and receiver 52, all of which may be connected together as one unit, although in at least some embodiments the unit may be separated into more than one housing. The controller glasses 61 then wirelessly connects to the computer device 40 so the computer or mobile device can receive process and calibrate the plurality of brain-body signals and accessory sensor signals generated by user 10. The computer device 40 then wirelessly transmits a plurality of command signals to the controllable device 80 shown as a car 80 in FIG. 22. The computer device 40 may also connect to one or more server application program 102, accessible via the Internet 101, for access and use of data and software not located on the computer device or head-mounted device 460.

In the systems 400,500 of FIGS. 20 and 22, the user 10 may also control a computer, smart phone or internet software applications which are displayed for viewing by the user 10. In the system 400 of FIG. 20, images may be viewed on the user interface display 44, while in the system 500 of FIG. 22, images may be viewed either on the user interface display 44 or via the image display system 70.

Figure 24:
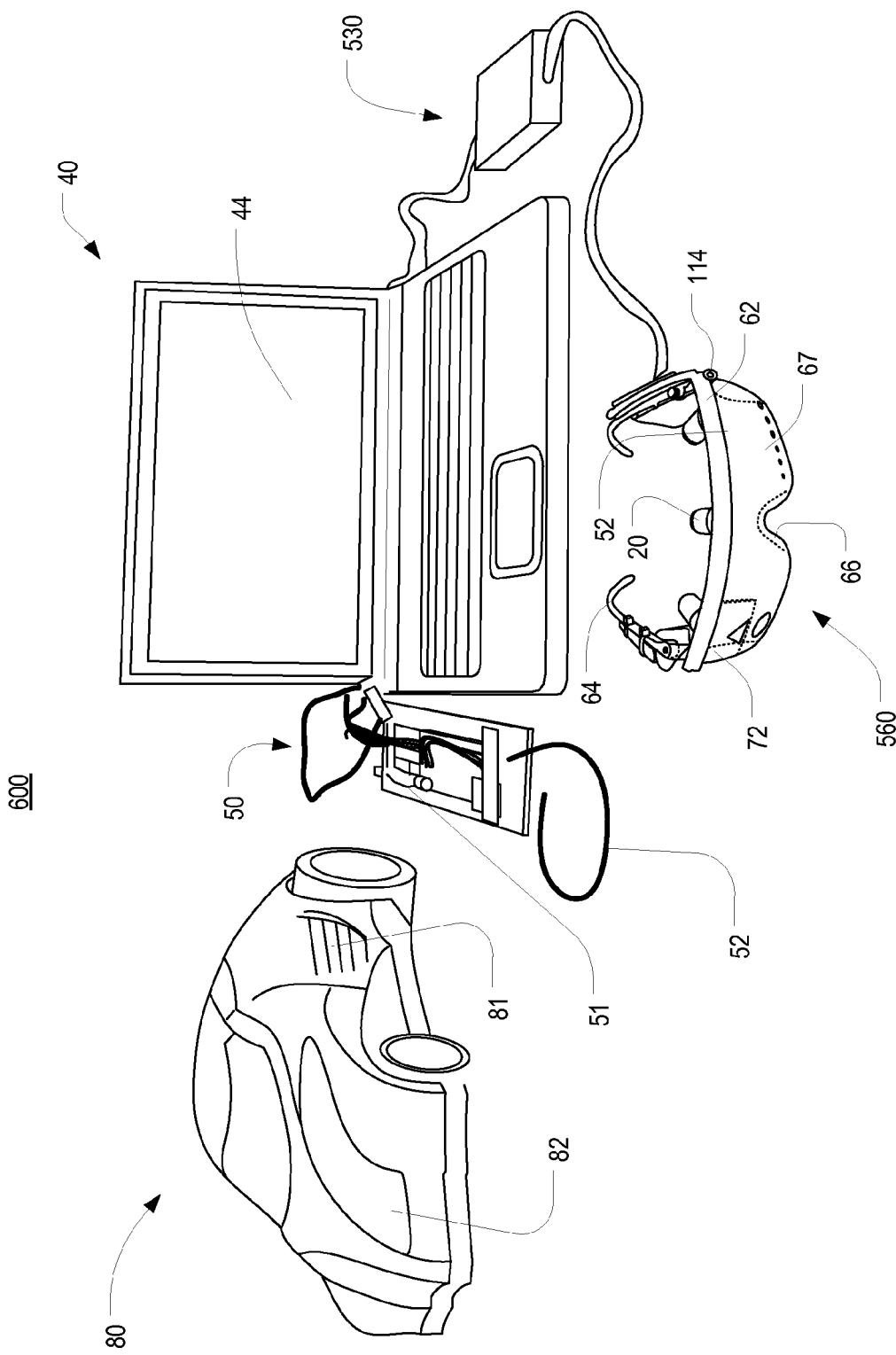
FIG. 24 is a perspective view of a system employing a plurality of brain/body-generated inputs to control the multi-action operation of a controllable device in accordance with another preferred embodiment of the present invention.
Figure 25:
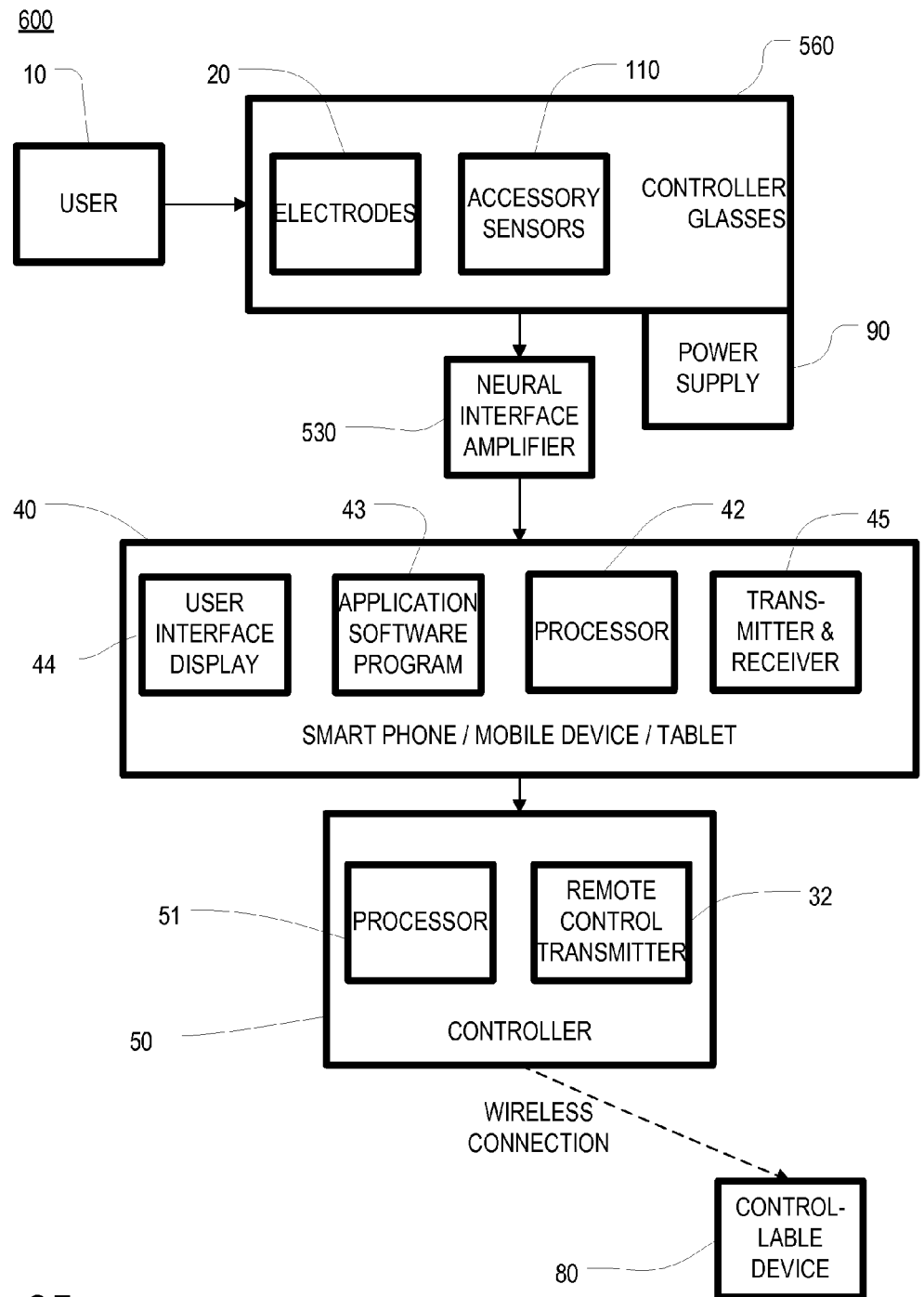
FIG. 25 is a block diagram of one implementation of the system of FIG. 24

FIG. 24 is a perspective view of a system 600 employing a plurality of brain/body-generated inputs to control the multi-action operation of a controllable device 80 in accordance with another preferred embodiment of the present invention, and FIG. 25 is a block diagram of one implementation of the system 600 of FIG. 24. As shown therein, the system 600 includes a head-mounted user interface device 560, worn on the head of a user 10, that communicates with a computer device 40, which may for example be a laptop computer, to control the operation of a device 80, via a separate controller 50, on the basis of input captured or received directly from the head of the user 10 by one or more electrodes 20. The connection from the controller 50 to the device 80 is preferably wireless, but may in some implementations be wired.

The head-mounted user interface device 560 may be similar to that of FIGS. 16-20. The computer device 40 may have characteristics similar to that of previously-described computer devices 40, but communicates with the controllable device 80 via a dedicated controller 50, rather than directly. Furthermore, communications with the dedicated controller 50 may be more preferably be carried out by wired connection, although in some embodiments, a wireless connection may be utilized.

The dedicated controller 50 receives, processes, and transmits a plurality of data signals from the computer 40 to command the operation of the controllable device 80, which may be a multi-action machine, electronic device, software program, or the like. The controller 50 includes its own processor 51 as well as a remote control transmitter 32 that broadcasts and receives signals to remotely control the controllable device 80. The processor 51 and transmitter 32 may be contained in a housing (a portion of which is shown in FIG. 24), which may also hold the power and structure requirements of the controller 50.

The transmitter 32 may communicate with the controllable device 80 via wire, or may communicate wirelessly. In the event that communication between the controller and the machine, electronic device, or other controllable device 80 occurs wirelessly, the wireless communication can occur via any wireless communication method such as; RC, Bluetooth, IR, Radio or any communication methodology that transfers information between two or more points that are not connected by an electrical conductor.

To use the system 600 of FIGS. 24 and 25, the user 10 puts on, places, and/or wears head-mounted user interface device 560 on their cranium 11. The head-mounted user interface device 560 is supported on the user's cranium 11 with the glasses ear support 64 and the glasses nose support 66. Systems of the controller glasses 61 are supported by the glasses frame support 62. The user 10 sees out of the controller glasses through the glasses lens 67, which also provides eye protection from flying objects. The electrodes 20 contact with the user's cranium 11 for electrical connection and the electrodes 20 are connected to a multi-signal neural interface amplifier 530 which receives process and amplifies a plurality of brain-body signals. In at least one embodiment the multi-signal neural interface amplifier 530 is external to the controller glasses 61. The computer's processor processes the data received by the multi-signal neural interface amplifier 530 together with accessory sensor data from the accessory sensors 110 for use by the computer 40 and the application software program 43 located on the computer 40. The computer 40 is attached to the controller 50, which is comprised of the controller processor 51 and the wireless transmitter 32. The control processor 51 processes the data received by the computer 40 for use by the wireless transmitter 32. The wireless transmitter 32 transmits the data received by the control processor 51 and transmits the data in the form of a plurality of broadcasted signals to the controllable device 80. The controllable device 80, shown as a car 80 in FIG. 24, then activates and operates pursuant to the signals received by the wireless transmitter 32 and is connected to the controller 50 wirelessly. One or more components of the system 600 may be electrically powered via house current or battery powered 90, depending on the given sub-system's electrical requirements.

Although not illustrated, in at least some arrangements, the computer device 40 and/or the controller 50, and by extension the controller glasses 61, may connect to the Internet 101 via Internet Connection Method and utilize application software Programs 102 and receive data which may then be utilized by the user.

Figure 26:
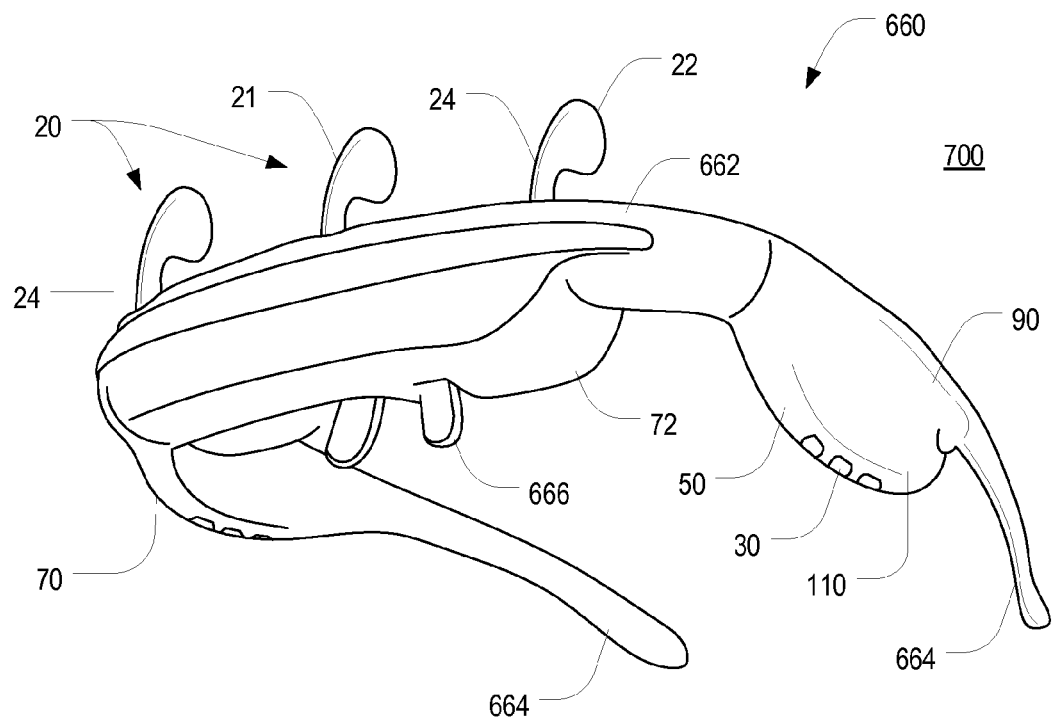
FIG. 26 is a perspective view of a system employing a plurality of brain/body-generated inputs to control the multi-action operation of a controllable device in accordance with another preferred embodiment of the present invention.
Figure 26:
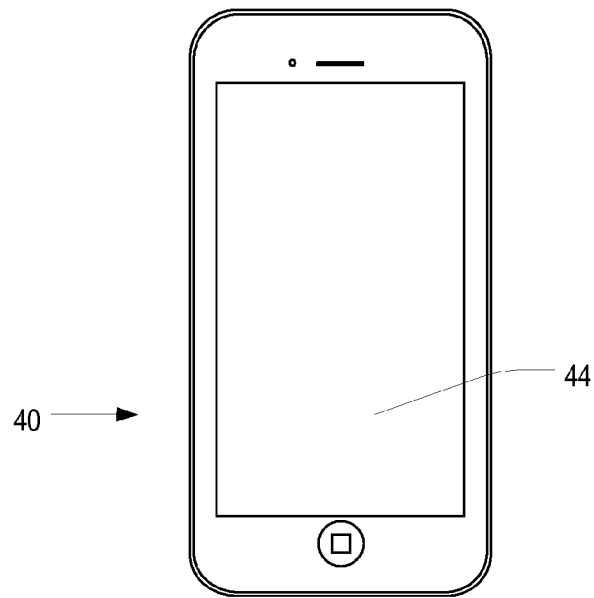
Figure 27:
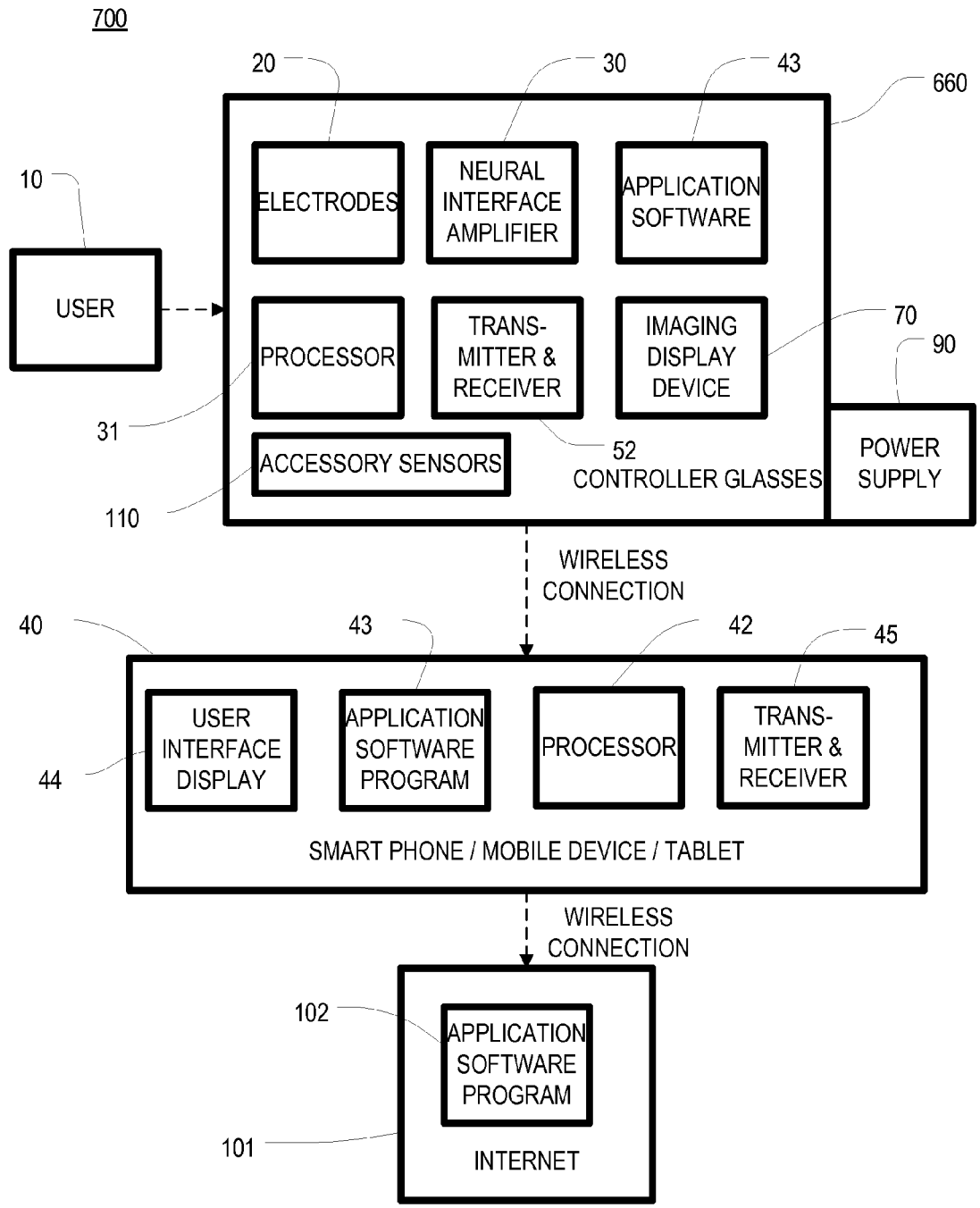
FIG. 27 is a block diagram of one implementation of the system of FIG. 26.

FIG. 26 is a perspective view of a system 700 employing a plurality of brain/body-generated inputs to control the multi-action operation of a controllable device 80 in accordance with another preferred embodiment of the present invention, and FIG. 27 is a block diagram of one implementation of the system 700 of FIG. 26 which shows an embodiment that controls a website and programs on the internet via a mobile device. As shown therein, the system 700, is completely wireless and includes a head-mounted user interface device 660, worn on the head of a user 10, that communicates with a computer device 40, which may for example be a mobile device, via wireless connection, on the basis of input captured or received directly from the head of the user 10 by one or more electrodes 20. The head-mounted user interface device 660 may be operationally similar to the user interface device 460 of FIGS. 22 and 23, but is provided in a more refined form factor than that of FIG. 22.

In addition to differences in frame support 662, ear supports 664, and nose support 666, one form factor difference is the use of a plurality of electrode arms 24. The electrode arms 24 are used in some embodiments of the present invention to connect the electrode stems 21 to a frame support 662. Each electrode arm 24 may be an adjustable support structure which allows the user 10 to adjust the position of the electrode stem 21 and input surface 22 for optimal positioning of the sensors on the user's cranium 11. The electrodes 20, electrode stem 21 and or electrode arm 24 may be installed on the frame support 62 of the head-mounted user interface device 660.

To use the system 700 of FIGS. 26 and 27 the user 10 puts on, places, and/or wears the head-mounted user interface device 660 on their cranium 11. The head-mounted user interface device 660 is supported on the user's cranium 11 with the ear support 664 and the nose support 666. Systems of the head-mounted user interface device are supported by the frame support 662. The head-mounted user interface device 660 is placed on the user 10 thus connecting or interfacing the electrodes 20 to the user's cranium 11, thus providing electrical signal connection to acquire multiple brain-body electrical signals. The head-mounted user interface device 660 has integrated electrodes 20, accessory sensors 110, a multi-signal neural interface amplifier 30, processor 31, application software 43, transmitter and/or receiver 52, and in some embodiments may have an image display system 70, which are all connected together as one unit. The head-mounted user interface device 660 then wirelessly connects to a computer device 40 so the computer device 40 can receive, process and calibrate the plurality of brain-body signals generated by user 10. The computer device 40 may also connect to one or more server application program 102, accessible via the Internet 101, for access and use of data and software not located on the computer device or head-mounted device 660. The computer, smart phone, or internet software program(s) can then be operated pursuant to the signals received by the head-mounted device 660.

The entire system may be electrically powered via house current or battery powered for the power supply 90, pending the given sub-systems electrical requirements.

Figure 28:
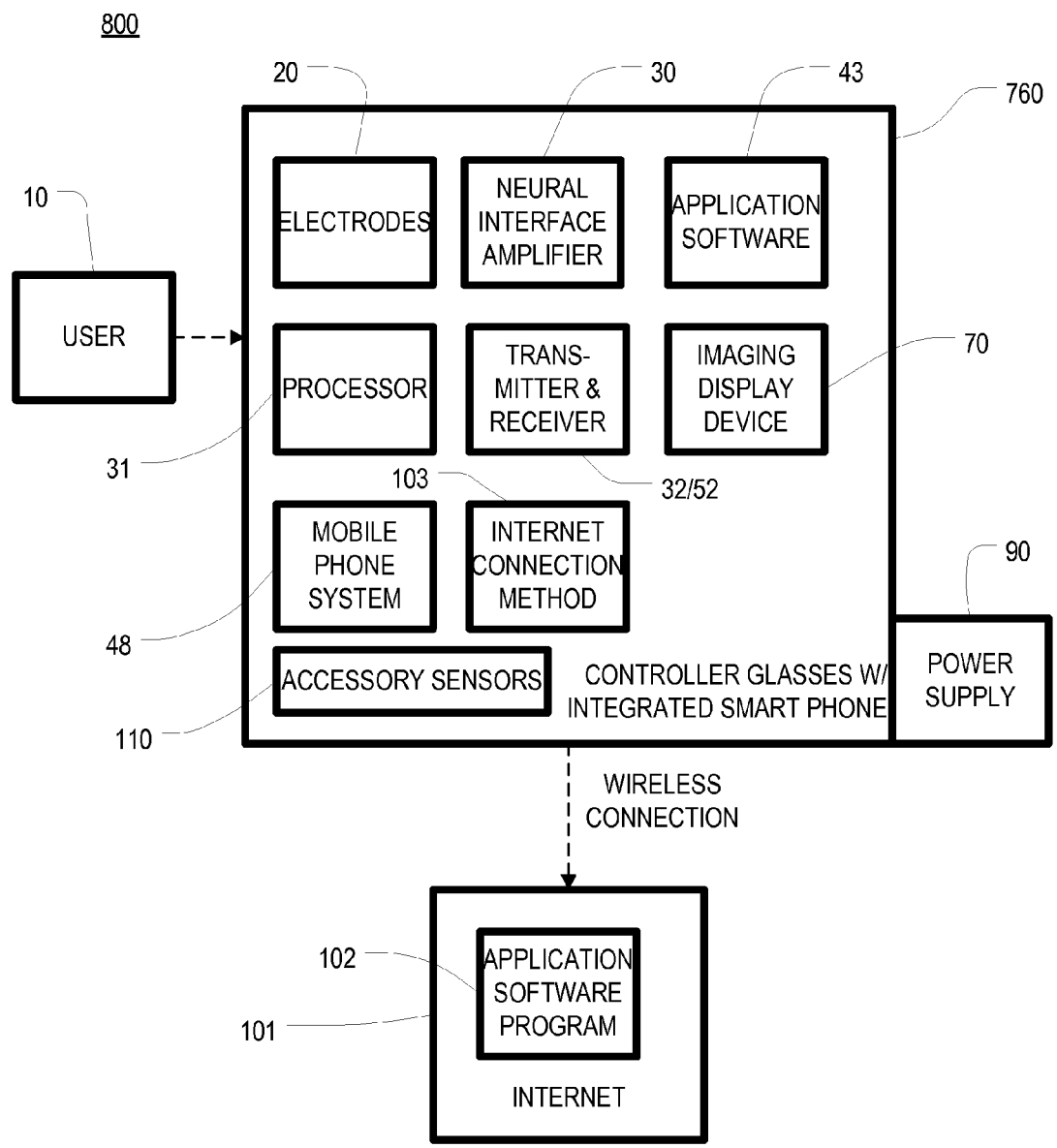
FIG. 28 is a block diagram of a system employing a plurality of brain/body-generated inputs to control the multi-action operation of an integrated telephone system in accordance with another preferred embodiment of the present invention.

FIG. 28 is a block diagram of a system 800 employing a plurality of brain/body-generated inputs to control the multi-action operation of an integrated telephone system in accordance with another preferred embodiment of the present invention. As shown therein, the system 800, is completely wireless and includes a head-mounted user interface device 760, worn on the head of a user 10. The device 760 includes an integrated mobile phone system 48 which may capture input received directly from the head of the user 10 by one or more electrodes 20. The head-mounted user interface device 760 is somewhat similar to the user interface device 260 of FIGS. 14 and 19 but also includes an integrated mobile phone system 48.

To use the system 800, the user places the head-mounted user interface device 760 on the user's cranium 11. The integrated electrodes 20, multi-signal neural interface amplifier 30, accessory sensors 110, processor(s) 31, application software 43, transmitters and receivers 32, an image display system 70, mobile phone system 48, and power supply 90 are all connected together as one unit. The device 760 with processor(s) 31, receives, processes, and calibrates the plurality of brain-body and accessory sensor signals generated by user 10. The device 760 then wirelessly connects to the internet via internet connection method so the device 760 can receive internet data and data from application software program 102 located on the internet or internet cloud. The user 10 may control internet software applications which are displayed by the image display system 70 in the device 760. The internet software program(s) can them be operated pursuant to the signals received by the device 760.

The entire system may be electrically powered via house current or battery powered for the power supply 90, pending the given sub-systems electrical requirements.

Figure 29:
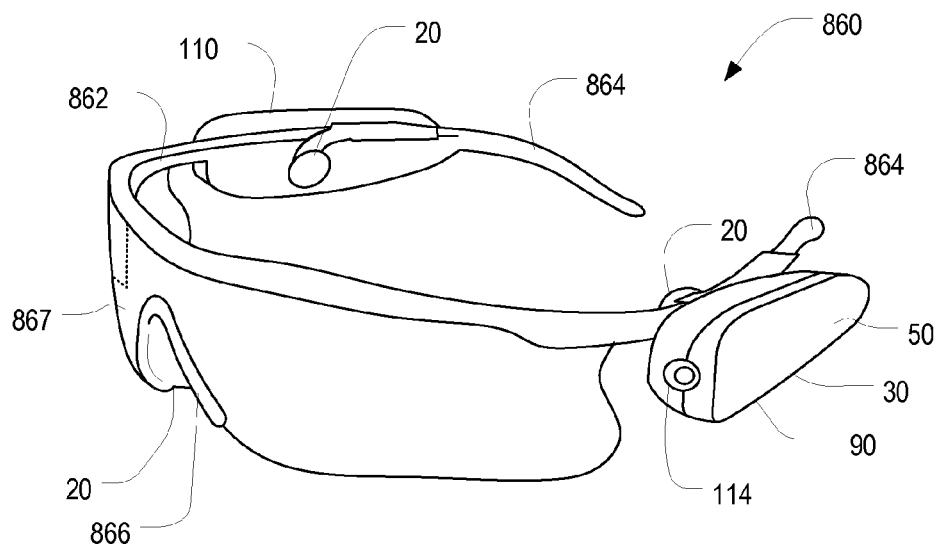
FIG. 29 is a left front perspective view of an alternative head-mounted user interface device for use in one or more of the systems described herein.
Figure 30:
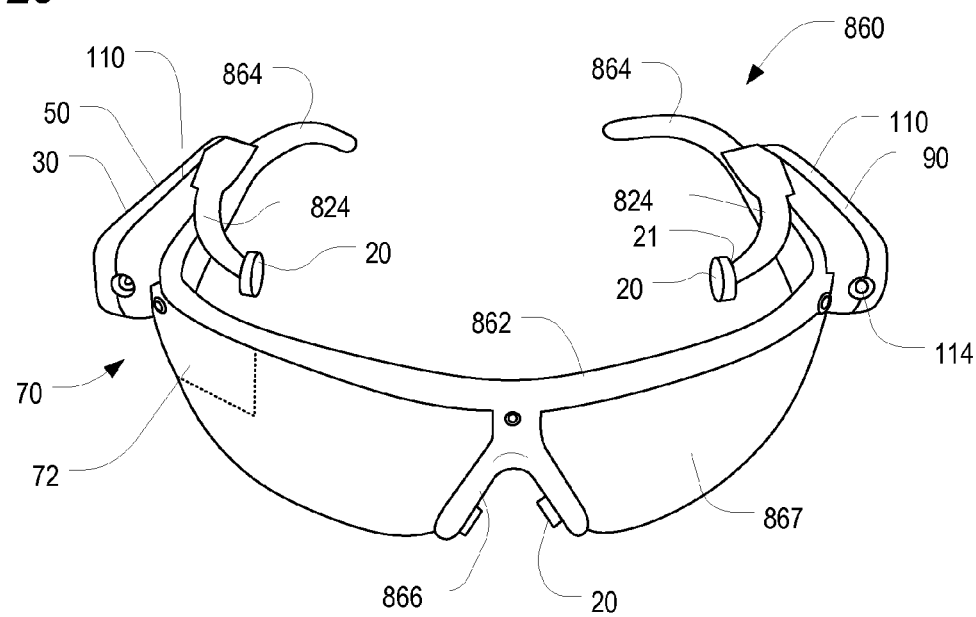
FIG. 30 is a front top perspective view of the alternative head-mounted user interface device of FIG. 29.

FIGS. 29 and 30 are a left front perspective view and a front top perspective view, respectively, of an alternative head-mounted user interface device 860 for use in one or more of the systems described herein. As shown therein, the device 860 utilizes a different form factor than other head-mounted user interface devices described herein. In particular, although many components are functionally similar to those of other head-mounted user interface devices described herein, a frame of the device 860 includes a frame support 862, ear supports 864, and a nose support 866 that have structural variations, as do the lenses 867. In addition, electrodes 20 are located in different locations. In particular, two electrodes 20 are located on electrode arms 824 extending from the ear supports 864 and on the nose support 866.

To use the head-mounted user interface device 860 of FIGS. 29 and 30, a user 10 puts on, places, and/or wears the head-mounted user interface device 860 on their cranium 11. The head-mounted user interface device 860 is supported on the user's cranium 11 with the ear support 864 and the nose support 866. Systems of the head-mounted user interface device are supported by the frame. The head-mounted user interface device 860 is placed on the user 10 thus connecting or interfacing the electrodes 20 to the user's cranium 11, thus providing electrical signal connection to acquire multiple brain-body electrical signals. Further operation is similar to one or more of the other head-mounted user interface devices described herein.

Figure 31:
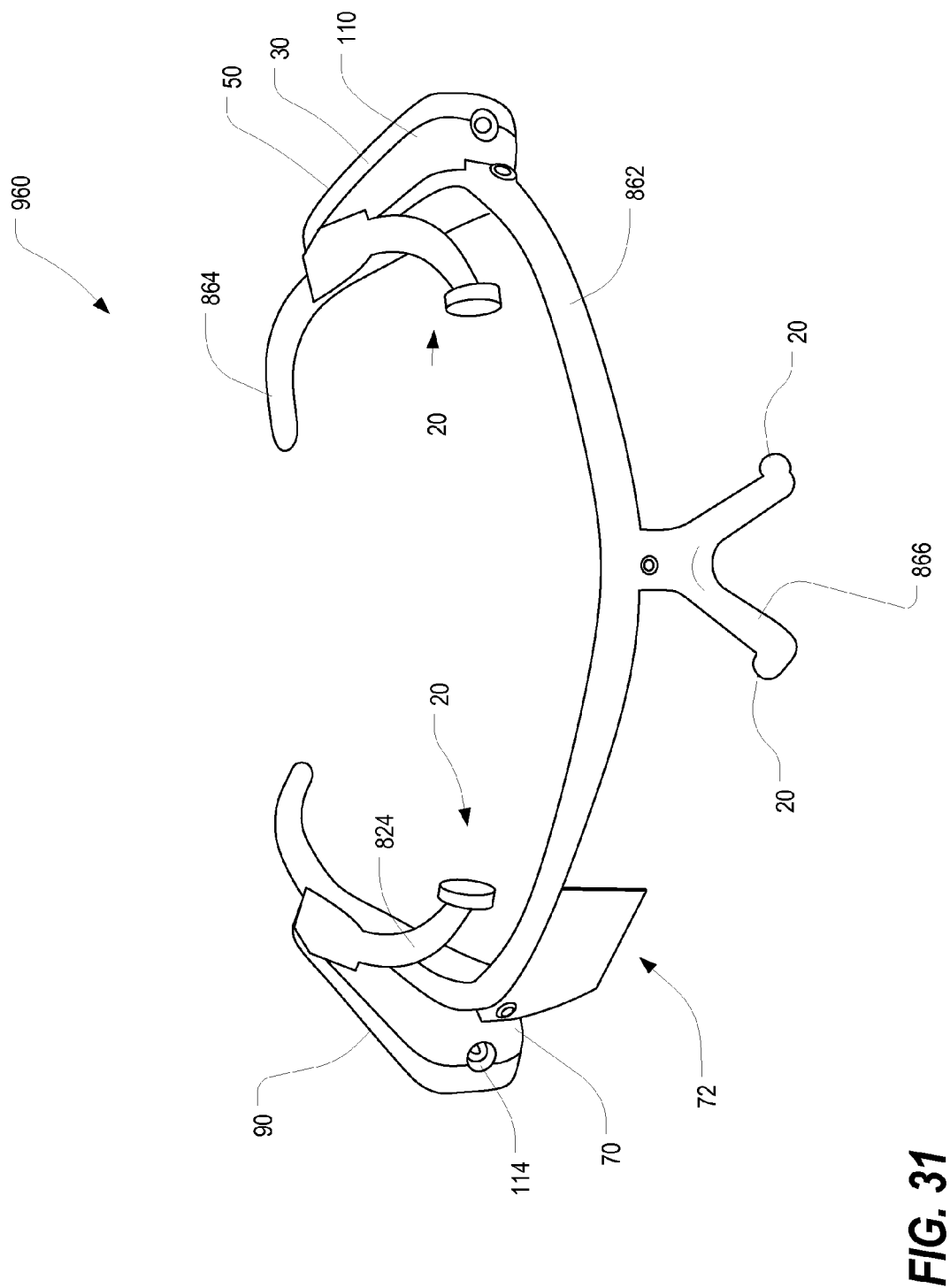
FIG. 31 is a front perspective view of another alternative head-mounted user interface device for use in one or more of the systems described herein.

In some embodiments, a head-mounted user interface device is provided that utilizes a glasses frame elements, but does not include lenses. In this regard, FIG. 31 is a front perspective view of another alternative head-mounted user interface device 960 for use in one or more of the systems described herein. As shown therein, the head-mounted user interface device 960 is similar to that of FIGS. 29 and 30, but does not include lenses.

In some other embodiments, a head-mounted user interface device is provided in the form of a headband, hat, helmet or other head-mounted wearable device.

In various embodiments, the head-mounted user interface device components may be separated or be combined and housed on or in one unit housing. The processing software for the multi-signal neural interface amplifier, computer and controller can be loaded on separated or shared processor(s). The head-mounted user interface device may or may not have an imaging display device. The frame may be in the form a wearable band or hat that is placed on the head. The machine or software being controlled by the head-mounted user interface device can be connected via any wireless signal including, cellular, bluetooth, radio, digital, Wi-Fi or other. The embodiments of the present invention described herein are not intended to be exhaustive or to limit the invention to the precise forms disclosed in the detailed description. Rather, the embodiments are chosen and described so that others skilled in the art may appreciate and understand the principles and practices of the present invention.

In summary, in at least some embodiments, the user wears the head-mounted user interface device which connects the electrodes and accessory sensors to the user. The user generates multiple brain/body, motion and biometric signals and then the head-mounted user interface device receives said user generated signals via the electrodes and accessory sensors. A plurality of user-generated brain/body signals may be received, processed and amplified by the multi-signal neural interface amplifier. A plurality of user-generated motion and biometric signals may be received by various accessory sensors. The signals from the multi-signal neural interface amplifier and the accessory sensors may then be transmitted to a computer and/or processor(s) where the data is calibrated, processed and mapped to various machine, electronic device or software program actions. Using the image display system, or a display on another device, the user may view the data corresponding to or representative of their brain/body and motion electrical signals. The user may also view software programs or internet applications with the image display system, and control such programs using the head-mounted user interface device. Once one of the disclosed systems has been calibrated to the machine, electronic device or software, actions are mapped to correspond to the user's brain/body and motion signals, and the user may then produce a plurality of brain/body and motion signals to remotely operate a multi-action controllable device, which may be machine, electronic device, software or internet program via any state-of-the-art remote broadcast methodology.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A system employing a plurality of brain/body-generated inputs to control the multi-action operation of a video game, comprising:
    a video game system, operable to perform at least two actions via remote control; and
    a head-mounted user interface device, comprising:
        a frame, adapted to be worn on the cranium of a user, a first sensor, comprising a first electrode, that is supported by the frame, arranged to be placed in contact with a surface of the scalp of the cranium when the frame is worn by the user, and adapted to receive a first bioelectric signal from the user, a second sensor, comprising a second electrode, that is supported by the frame, arranged to be placed in contact with a surface of the scalp of the cranium when the frame is worn by the user, and adapted to receive a second bioelectric signal from the user, a processor, supported by the frame, that utilizes application software to receive and process input provided by the first and second sensors, including the first bioelectric signal and the second bioelectric signal, to distinguish between the strength of the first and second bioelectric signals, and to generate an output, selected from at least first and second different outputs, based on the difference in strength, and a transmitter, supported by the frame, that is communicatively connected to the processor and is adapted to transmit a signal to the video game system, the signal representative of a command, corresponding to the selected output, to initiate a first or second of the at least two actions performed by the video game system.

2. The system of claim 1, wherein the head-mounted user interface device further comprises at least one neural interface amplifier communicatively coupled between the first and second electrode and the processor to amplify the bioelectric signal received from the user and provide the amplified signal to the processor.

3. The system of claim 2, wherein the frame includes:
two ear supports adapted to extend over, and be retained by, ears on the cranium of the user;
a frame support extending between the two ear supports; and
a nose support depending from the frame support and adapted to rest on a nose on the cranium of the user.

4. The system of claim 3, wherein the frame is a glasses frame that further includes a lens depending from the frame support.

5. The system of claim 2, wherein the head-mounted user interface device further comprises an image display system supported by the frame.

6. The system of claim 5, wherein the image display system includes a controller/projector and a screen.

7. The system of claim 6, wherein the screen is positioned in the direct view of the user.

8. The system of claim 7, wherein the screen is configured to superimpose a see-through image over the user's view of the user's surroundings.

9. The system of claim 6, wherein the image display system is adapted to display a plurality of options to the user, wherein the input provided by the first and second sensors is interpreted by the processor as a selection of a particular one of the plurality of options, and wherein the first and second different outputs are generated on the basis of the selected option.

10. The system of claim 2, wherein the electrode is adapted to receive an electroencephalographic signal.

11. The system of claim 10, wherein processor is adapted to recognize and respond to the strength of the electroencephalographic signal.

12. The system of claim 2, wherein the first electrode is adapted to receive an electromyographic signal.

13. The system of claim 2, wherein the first electrode is adapted to receive an electrooculographic signal.

14. The system of claim 2, further comprising an accessory sensor, wherein the accessory sensor is a tilt sensor adapted to monitor user motion when the frame is worn by the user.

15. The system of claim 2, wherein the processor utilizes the application software to map the input provided by the first and second sensors, including the bioelectric signal, to any of a plurality of particular commands to be communicated to the video game system.

16. The system of claim 1, wherein the first bioelectric signal and the second bioelectric signal include an electroencephalographic signal and an electromyographic signal.

17. The system of claim 1, wherein the first bioelectric signal and the second bioelectric signal include an electroencephalographic signal and an electrooculographic signal.

18. The system of claim 1, wherein the first bioelectric signal and the second bioelectric signal include an electromyographic signal and an electrooculographic signal.

19. The system of claim 1, wherein the first and second bioelectric signals are each one of an Alpha, a Beta, a Delta, a Gamma, and a Theta wave in an electroencephalographic signal.

20. A system employing a plurality of brain/body-generated inputs to control the multi-action operation of a video game, comprising:
a video game system, operable to perform at least two actions via remote control; and
a head-mounted user interface device, comprising:
a frame, adapted to be worn on the cranium of a user,
a first sensor, comprising a first electrode, that is supported by the frame, arranged to be placed in contact with a surface of the scalp of the cranium when the frame is worn by the user, and adapted to receive a first bioelectric signal from the user,
a second sensor, comprising a second electrode, that is supported by the frame, arranged to be placed in contact with a surface of the scalp of the cranium when the frame is worn by the user, and adapted to receive a second bioelectric signal from the user,
a processor, supported by the frame, that utilizes application software to receive and process input provided by the first and second sensors, including the first bioelectric signal and the second bioelectric signal, to identify psychological or physiological arousal of the user based on at least one of the first and second bioelectric signals, and to generate an output, selected from at least first and second different outputs, based on such arousal, and
a transmitter, supported by the frame, that is communicatively connected to the processor and is adapted to transmit a signal to the video game system, the signal representative of a command, corresponding to the selected output, to initiate a first or second of the at least two actions performed by the video game system.

21. The system of claim 20, wherein the first sensor is a skin conductance sensor that identifies physical arousal by measuring electrical conductance of the user's skin, which varies with the moisture level of as generated by the user's sweat glands under control of the sympathetic nervous system of the user.

22. The system of claim 20, wherein the first sensor is a temperature sensor that identifies physical arousal by measuring the user's body temperature.

23. The system of claim 20, wherein the first sensor is a heart rate sensor that measures the user's rate in real time and identifies physical arousal by identifying an elevated heart rate of the user.

* * * * *